United States Patent
Ma et al.

(10) Patent No.: US 12,432,576 B2
(45) Date of Patent: Sep. 30, 2025

(54) INDICATING A LOSS OF COHERENCE IN A WIRELESS NETWORK

(71) Applicant: QUALCOMM Incorporated, San Diego, CA (US)

(72) Inventors: Liangping Ma, San Diego, CA (US); Tao Luo, San Diego, CA (US); Gokul Sridharan, Sunnyvale, CA (US); Hung Dinh Ly, San Diego, CA (US); Xiao Feng Wang, San Diego, CA (US); Mahmoud Taherzadeh Boroujeni, San Diego, CA (US); Jun Ma, San Diego, CA (US); Alberto Rico Alvarino, San Diego, CA (US); Wanshi Chen, San Diego, CA (US); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 650 days.

(21) Appl. No.: 17/660,509

(22) Filed: Apr. 25, 2022

(65) Prior Publication Data
US 2022/0353702 A1    Nov. 3, 2022

Related U.S. Application Data

(60) Provisional application No. 63/201,417, filed on Apr. 28, 2021.

(51) Int. Cl.
*H04W 24/02*    (2009.01)
*H04W 24/08*    (2009.01)

(52) U.S. Cl.
CPC .......... *H04W 24/02* (2013.01); *H04W 24/08* (2013.01)

(58) Field of Classification Search
None
See application file for complete search history.

(56) References Cited

U.S. PATENT DOCUMENTS

| 6,185,265 B1 * | 2/2001 | Campanella .......... H03M 13/15 714/795 |
| 8,437,792 B2 | 5/2013 | Malladi et al. |

(Continued)

FOREIGN PATENT DOCUMENTS

| WO | WO-2008101056 | 8/2008 |
| WO | WO-2020089471 A1 | 5/2020 |

OTHER PUBLICATIONS

International Search Report and Written Opinion—PCT/US2022/071934—ISA/EPO—Aug. 12, 2022.

*Primary Examiner* — Nicholas Sloms
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of a loss of coherence associated with the UE. The UE may perform at least one adjustment to a transmission parameter or a reception parameter based at least in part on the indication of the loss of coherence. For example, the adjustment to the transmission parameter may include adjusting a transmit power, adjusting a transmit frequency, adapting a transmission time, changing an antenna port, or a combination thereof. Additionally, or alternatively, the adjustment to the reception parameter may include refraining from joint channel estimation across a plurality of slots, adjusting a downscaling parameter or a frequency tuning associated with at least one reception antenna, refraining from blind decoding, or a combination thereof. Numerous other aspects are described.

31 Claims, 13 Drawing Sheets

(56) References Cited

U.S. PATENT DOCUMENTS

| | | | |
|---|---|---|---|
| 2010/0279707 A1* | 11/2010 | Fischer | G01S 5/0226 455/67.11 |
| 2011/0312320 A1* | 12/2011 | Moeglein | G01S 19/252 455/427 |
| 2012/0063425 A1* | 3/2012 | Wang | H04W 56/0045 370/336 |
| 2012/0244882 A1* | 9/2012 | Wilson | H04W 64/00 455/456.2 |
| 2014/0232601 A1* | 8/2014 | Ische | G01S 5/0236 342/464 |
| 2017/0373907 A1 | 12/2017 | Tan et al. | |
| 2018/0152907 A1* | 5/2018 | Zhang | H04W 56/0045 |
| 2019/0090201 A1 | 3/2019 | Akkarakaran et al. | |
| 2019/0166453 A1* | 5/2019 | Edge | G01S 5/06 |
| 2019/0222302 A1* | 7/2019 | Lin | H04W 56/0035 |
| 2019/0327628 A1* | 10/2019 | Jain | H04W 24/10 |
| 2019/0369264 A1* | 12/2019 | Hua | G01S 19/254 |
| 2020/0053719 A1* | 2/2020 | Sadiq | G01S 5/02 |
| 2020/0313754 A1 | 10/2020 | Wang et al. | |
| 2021/0006385 A1* | 1/2021 | Zhou | H04L 1/1657 |
| 2021/0333352 A1* | 10/2021 | Thompson | G01S 5/0244 |
| 2022/0263569 A1* | 8/2022 | Fan | H04W 56/001 |

\* cited by examiner

INDICATING A LOSS OF COHERENCE IN A WIRELESS NETWORK

CROSS-REFERENCE TO RELATED APPLICATION

This patent application claims priority to U.S. Provisional Patent Application No. 63/201,417, filed on Apr. 28, 2021, entitled "INDICATING A LOSS OF COHERENCE IN A WIRELESS NETWORK," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for indicating a loss of coherence in a wireless network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication. The apparatus may include a memory comprising instructions. The one or more processors may be configured to execute the instructions and cause the apparatus to obtain an indication of a loss of coherence associated with the apparatus. The one or more processors may be further configured to execute the instructions and cause the apparatus to perform at least one adjustment to a transmission parameter or a reception parameter based at least in part on the indication of the loss of coherence.

Some aspects described herein relate to an apparatus for wireless communication. The apparatus may include a memory comprising instructions. The one or more processors may be configured to execute the instructions and cause the apparatus to identify a loss of coherence associated with at least one UE. The one or more processors may be further configured to execute the instructions and cause the apparatus to output for transmission an indication of the loss of coherence.

Some aspects described herein relate to an apparatus for wireless communication. The apparatus may include a memory comprising instructions. The one or more processors may be configured to execute the instructions and cause the apparatus to obtain, from a gateway, a first indication of a loss of coherence associated with at least one UE. The one or more processors may be further configured to execute the instructions and cause the apparatus to generate a second indication of the loss of coherence based on the first indication. The one or more processors may be configured to execute the instructions and cause the apparatus to output for transmission the second indication.

Some aspects described herein relate to a method of wireless communication performed at a UE. The method may include obtaining an indication of a loss of coherence associated with the UE. The method may further include performing at least one adjustment to a transmission parameter or a reception parameter based at least in part on the indication of the loss of coherence.

Some aspects described herein relate to a method of wireless communication at a network entity or a gateway device. The method may include identifying a loss of coherence associated with at least one UE. The method may further include outputting for transmission an indication of the loss of coherence.

Some aspects described herein relate to a method of wireless communication performed at a network entity. The method may include obtaining, from a gateway, a first indication of a loss of coherence associated with at least one UE. The method may further include generating a second indication of the loss of coherence based on the first indication. The method may include outputting for transmission the second indication.

Some aspects described herein relate to a non-transitory computer-readable medium comprising instructions. The instructions, when executed by one or more processors of an apparatus, may cause the apparatus to obtain an indication of a loss of coherence associated with the apparatus. The instructions, when executed by one or more processors of the apparatus, may further cause the apparatus to perform at least one adjustment to a transmission parameter or a reception parameter based at least in part on the indication of the loss of coherence.

Some aspects described herein relate to a non-transitory computer-readable medium comprising instructions. The instructions, when executed by one or more processors of an apparatus, may cause the apparatus to identify a loss of coherence associated with at least one UE. The instructions, when executed by one or more processors of the apparatus, may further cause the apparatus to output for transmission an indication of the loss of coherence.

Some aspects described herein relate to a non-transitory computer-readable medium comprising instructions. The instructions, when executed by one or more processors of an apparatus, may cause the apparatus to obtain, from a gateway, a first indication of a loss of coherence associated with at least one UE. The set of instructions, when executed by one or more processors of the apparatus, may further cause the apparatus to generate a second indication of the loss of coherence based on the first indication. The set of instructions, when executed by one or more processors of the apparatus, may cause the apparatus to output for transmission the second indication.

Some aspects described herein relate to an apparatus for wireless communication. The apparatus may include means for obtaining an indication of a loss of coherence associated with the apparatus. The apparatus may further include means for performing at least one adjustment to a transmission parameter or a reception parameter based at least in part on the indication of the loss of coherence.

Some aspects described herein relate to an apparatus for wireless communication. The apparatus may include means for identifying a loss of coherence associated with at least one UE. The apparatus may further include means for outputting for transmission an indication of the loss of coherence.

Some aspects described herein relate to an apparatus for wireless communication. The apparatus may include means for obtaining, from a gateway, an indication of a loss of coherence associated with at least one UE. The apparatus may further include means for generating a second indication of the loss of coherence based on the first indication. The apparatus may include means for outputting for transmission an indication based at least in part on the loss of coherence.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
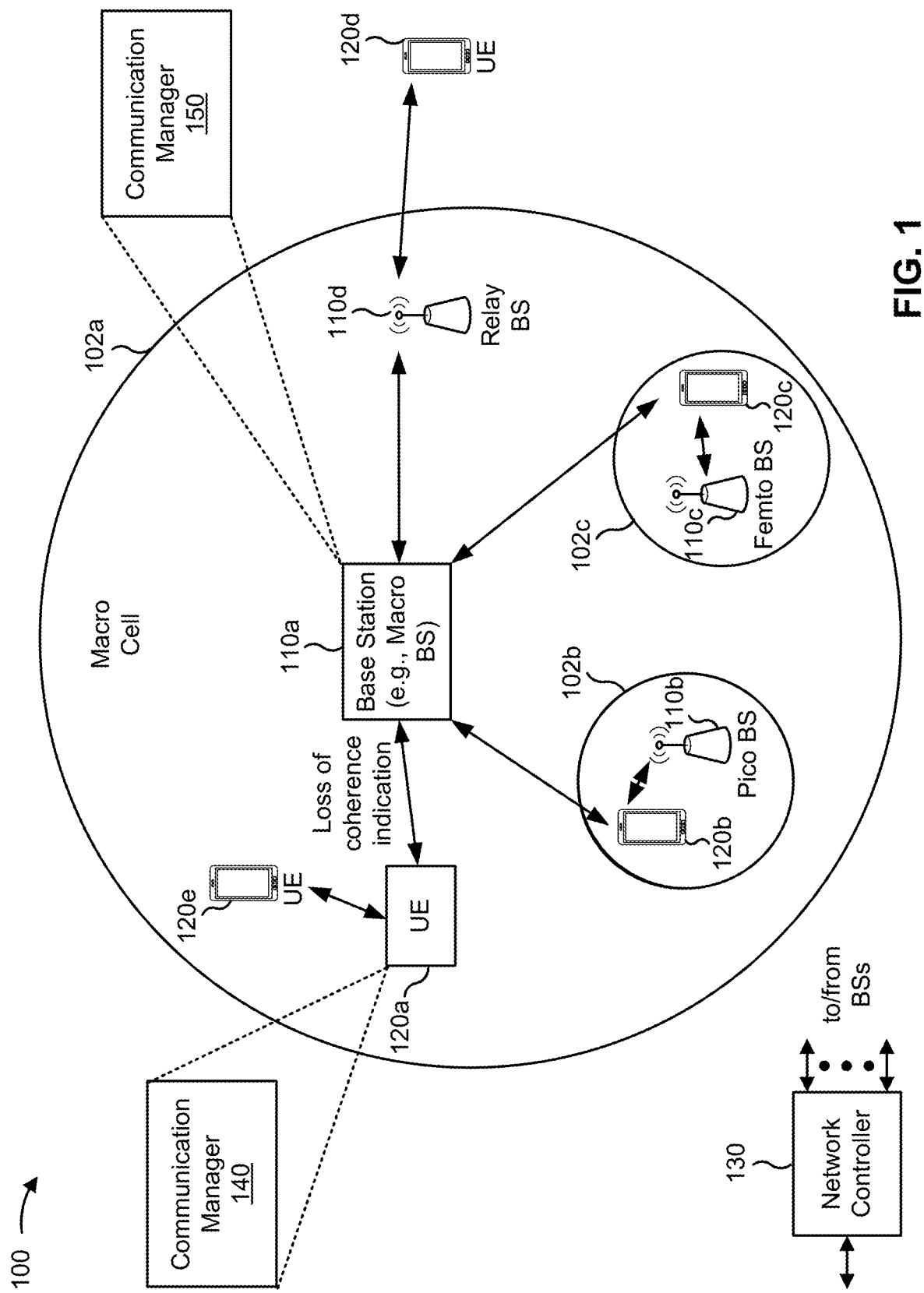
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some aspects, the wireless network 100 may include one or more non-terrestrial network (NTN) deployments in which a non-terrestrial wireless communication device may include a BS (referred to herein, interchangeably, as a "non-terrestrial BS" and "non-terrestrial base station") and/or a relay station (referred to herein, interchangeably, as a "non-terrestrial relay station"). As used herein, "non-terrestrial network" or "NTN" may refer to a network for which access is facilitated by a non-terrestrial BS and/or a non-terrestrial relay station.

The wireless network 100 may include any number of non-terrestrial wireless communication devices. A non-terrestrial wireless communication device may include a satellite (e.g., as described below in connection with FIG. 4) and/or a high-altitude platform (HAP). A HAP may include a balloon, a dirigible, an airplane, and/or an unmanned aerial vehicle. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs, other satellites in the one or more NTN deployments, other types of BSs (e.g., stationary or ground-based BSs), relay stations, gateways (e.g., as described below in connection with FIG. 4), and/or one or more components and/or devices included in a core network of wireless network 100. In some aspects, the satellite may be replaced by a HAP station, such as a balloon.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As shown in FIG. 1 and described in more detail elsewhere herein, the communication manager 140 may obtain (e.g., from the base station 110) an indication of a loss of coherence and perform at least one adjustment to a transmission parameter or a reception parameter based at least in part on the indication of the loss of coherence. Additionally, or alternatively, the communication manager 140 may perform one or more other operations described herein.

In some aspects, a network entity (e.g., the base station 110) may include a communication manager 150. As shown in FIG. 1 and described in more detail elsewhere herein, the communication manager 150 may identify a loss of coherence associated with a UE (e.g., the UE 120) and output for transmission (e.g., to the UE 120) an indication of the loss of coherence. Additionally, or alternatively, the communication manager 150 may perform one or more other operations described herein.

As indicated above, FIG. 1 is provided as an example. Other examples may differ from what is described with regard to FIG. 1.

Figure 2:
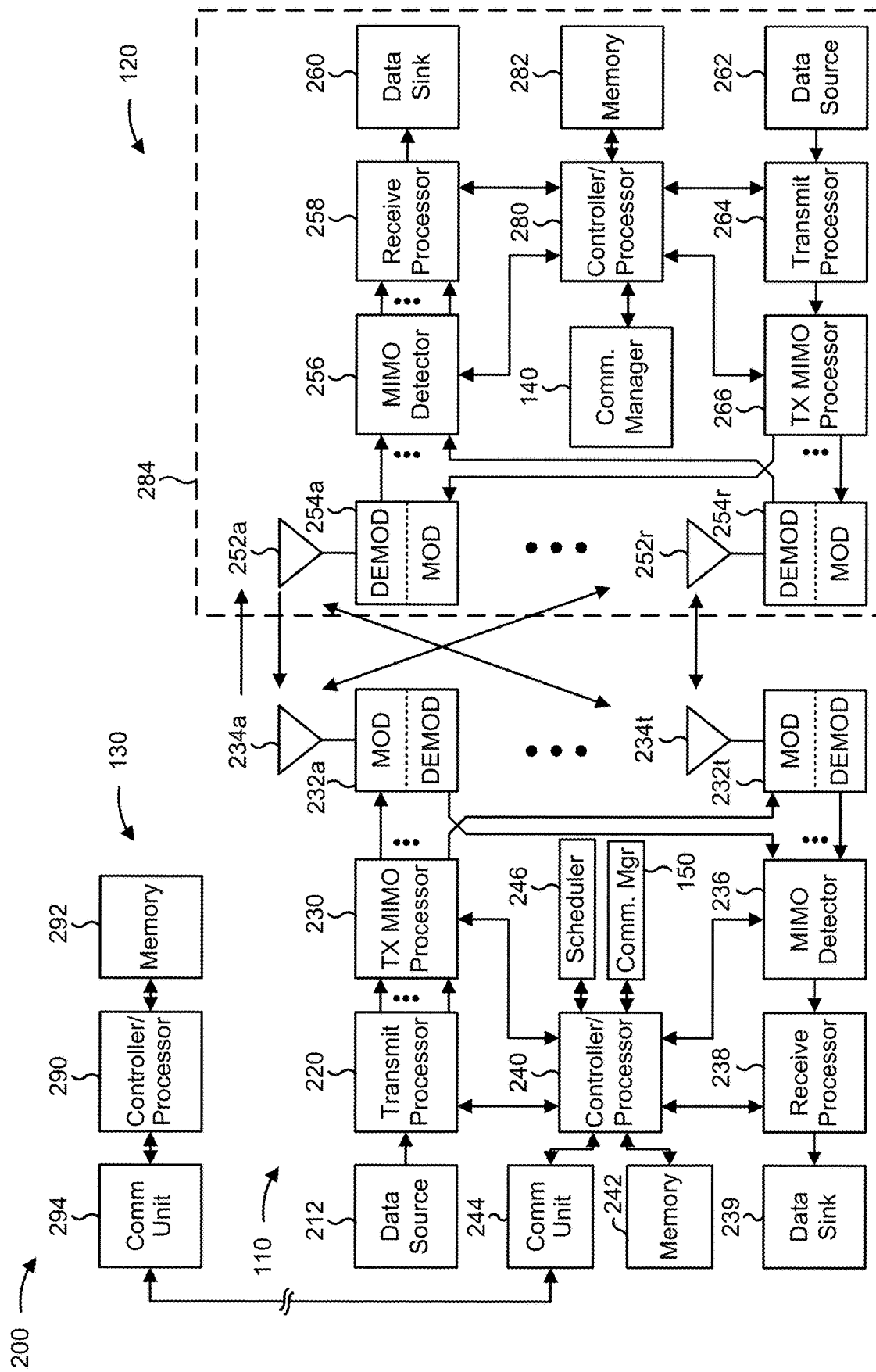
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-13).

The controller/processor 240 of the base station 110, the controller/processor 280 of the UE 120, and/or any other component(s) of FIG. 2 may perform one or more techniques associated with indicating a loss of coherence in a wireless network, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples. In some aspects, the network entity and/or the gateway described herein is the base station 110, is included in the base station 110, or includes one or more components of the base station 110 shown in FIG. 2.

In some aspects, a UE (e.g., the UE 120) may include means for obtaining (e.g., from a network entity) an indication of a loss of coherence associated with the UE and/or means for performing at least one adjustment to a transmission parameter or a reception parameter based at least in part on the indication of the loss of coherence. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., base station 110, CU 310, DU 330, and/or RU 340) may include means for identifying a loss of coherence associated with at least one UE (e.g., the UE 120) and/or means for outputting for transmission an indication of the loss of coherence. The means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a gateway device (e.g., the gateway device 505 as described below in connection with FIG. 5) may include means for identifying a loss of coherence associated with at least one UE (e.g., the UE 120) and/or means for outputting for transmission, to a network entity (e.g., base station 110, CU 310, DU 330, and/or RU 340), an indication of the loss of coherence. In some aspects, the means for the gateway device to perform operations described herein may include, for example, one or more of communication manager 515 (e.g., as described below in connection with FIG. 5), transmit processor 220, TX MIMO processor 230, modem 232, antenna 234, MIMO detector 236, receive processor 238, controller/processor 240, memory 242, or scheduler 246.

In some aspects, a network entity (e.g., base station 110, CU 310, DU 330, and/or RU 340) may include means for obtaining, from a gateway (e.g., the gateway 505 as described below in connection with FIG. 5), a first indication of a loss of coherence associated with at least one UE (e.g., the UE 120); means for generating a second indication of the loss of coherence based on the first indication; and/or means for outputting for transmission (e.g., to the at least one UE) the second indication. The means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
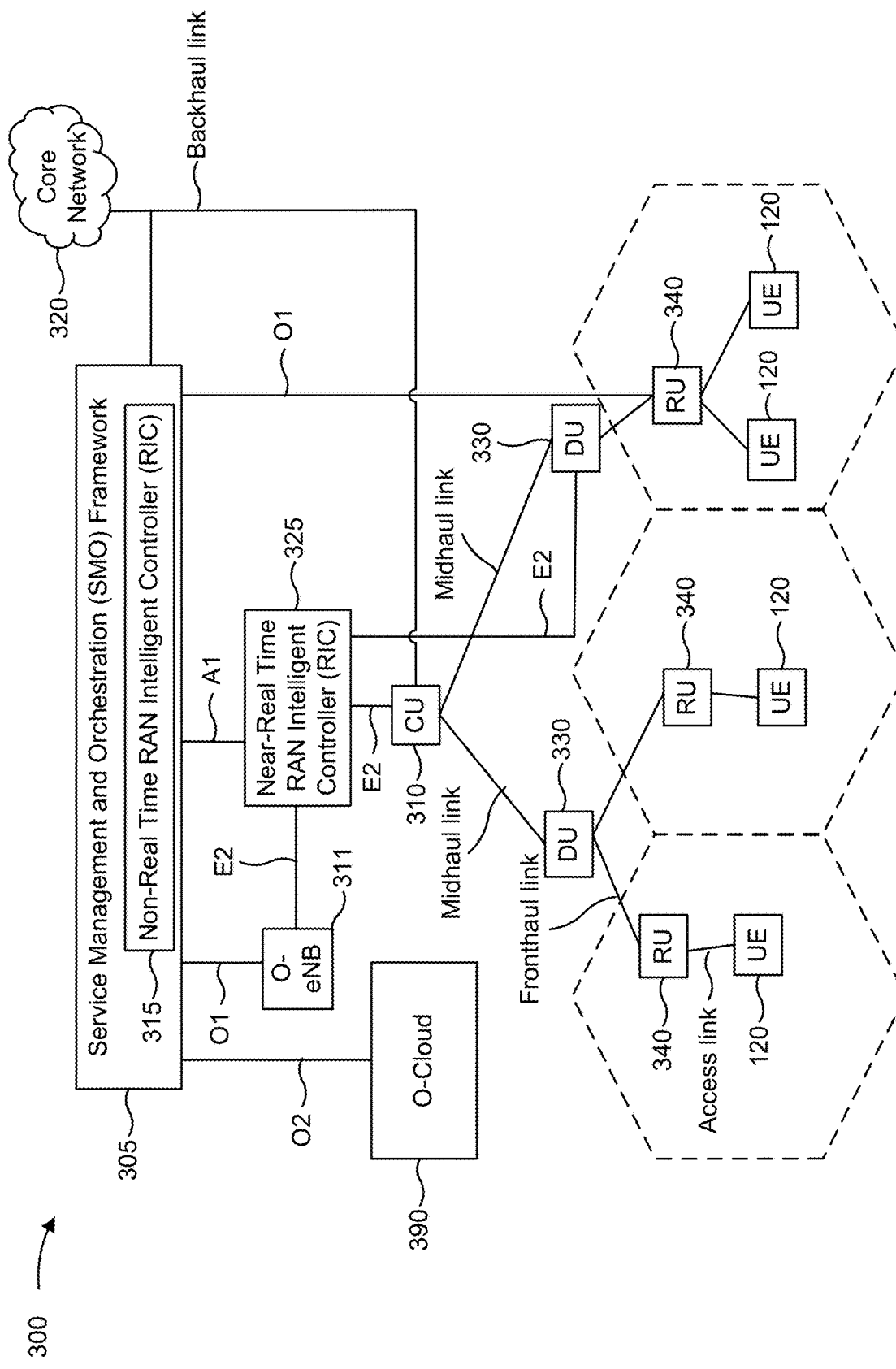
FIG. 3 is a diagram illustrating an example of disaggregated base station architecture, in accordance with the present disclosure.

FIG. 3 is a diagram illustrating an example 300 disaggregated base station architecture, in accordance with the present disclosure. Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (MC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an AI interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as AI policies).

As indicated above, FIG. 3 is provided as an example. Other examples may differ from what is described with regard to FIG. 3.

In some situations, a UE may maintain coherence when transmitting to a network entity. For example, a UE may maintain phase continuity and power consistency across repetitions of an uplink transmission (e.g., a physical uplink shared channel (PUSCH) transmission) such that the network entity can perform joint channel estimation across the repetitions. Accordingly, the network entity may perform combined decoding using the repetitions. However, in order to maintain coherence, the UE may not modify transmission parameters, such as a transmit power, a transmit frequency, a transmit time, or an antenna port associated with the uplink transmission. This can result in lower reliability and/or quality than if the UE were allowed to modify at least one transmission parameter (e.g., based at least in part on changing channel conditions with the base station). Additionally, the UE may not receive a downlink transmission between the repetitions in the case of time division duplexing (TDD).

Additionally, or alternatively, the UE may maintain coherence when receiving from a network entity. As used herein, "coherence" may refer to maintaining correlation between signals that are transmitted or received in different slots. For example, the network entity may maintain phase continuity and power consistency across repetitions of a downlink transmission (e.g., a physical downlink shared channel (PDSCH) transmission) such that the UE can perform joint channel estimation across the repetitions. However, joint channel estimation and decoding may fail if the downlink transmission has lost coherence.

Some techniques and apparatuses described herein enable a network entity (e.g., base station 110, CU 310, DU 330, and/or RU 340) to indicate a loss of coherence to a UE (e.g., UE 120). For example, the network entity may change an operating point of a power amplifier (PA) in an associated TRPs, change an antenna port (e.g., used for reception or transmission), and/or change TRPs and/or beams to support MIMO for the UE 120 and/or one or more other UEs. Accordingly, the network entity may lose coherence and indicate that loss to the UE 120. When the loss of coherence is associated with the uplink, the UE 120 may perform an adjustment to a transmission component, such as adjusting a transmit power, adjusting a transmit frequency, adjusting a transmit time, or changing an antenna port associated with uplink transmissions. As a result, the UE 120 improves quality and/or reliability of the uplink transmissions based at least in part on changing channel conditions with the network entity. The UE 120 also conserves network resources by reducing a chance of having to retransmit on the uplink due to low quality and/or reliability. In some aspects, the UE 120 additionally conserves power and/or processing resources by selecting a transmit power, transmit frequency, transmit time, and/or antenna port that requires less power and/or less computational complexity, respectively. In some aspects, the network entity may also schedule a downlink transmission earlier because the UE 120 does not need to maintain coherence across uplink repetitions, which reduces latency.

When the loss of coherence is associated with the downlink, the UE 120 may perform an adjustment to a reception component, such as refraining from joint channel estimation across a plurality of slots, adjusting a downscaling parameter or a frequency tuning associated with at least one reception antenna of the UE 120, or refraining from blind decoding. As a result, the UE 120 conserves power and processing resources.

Figure 4:
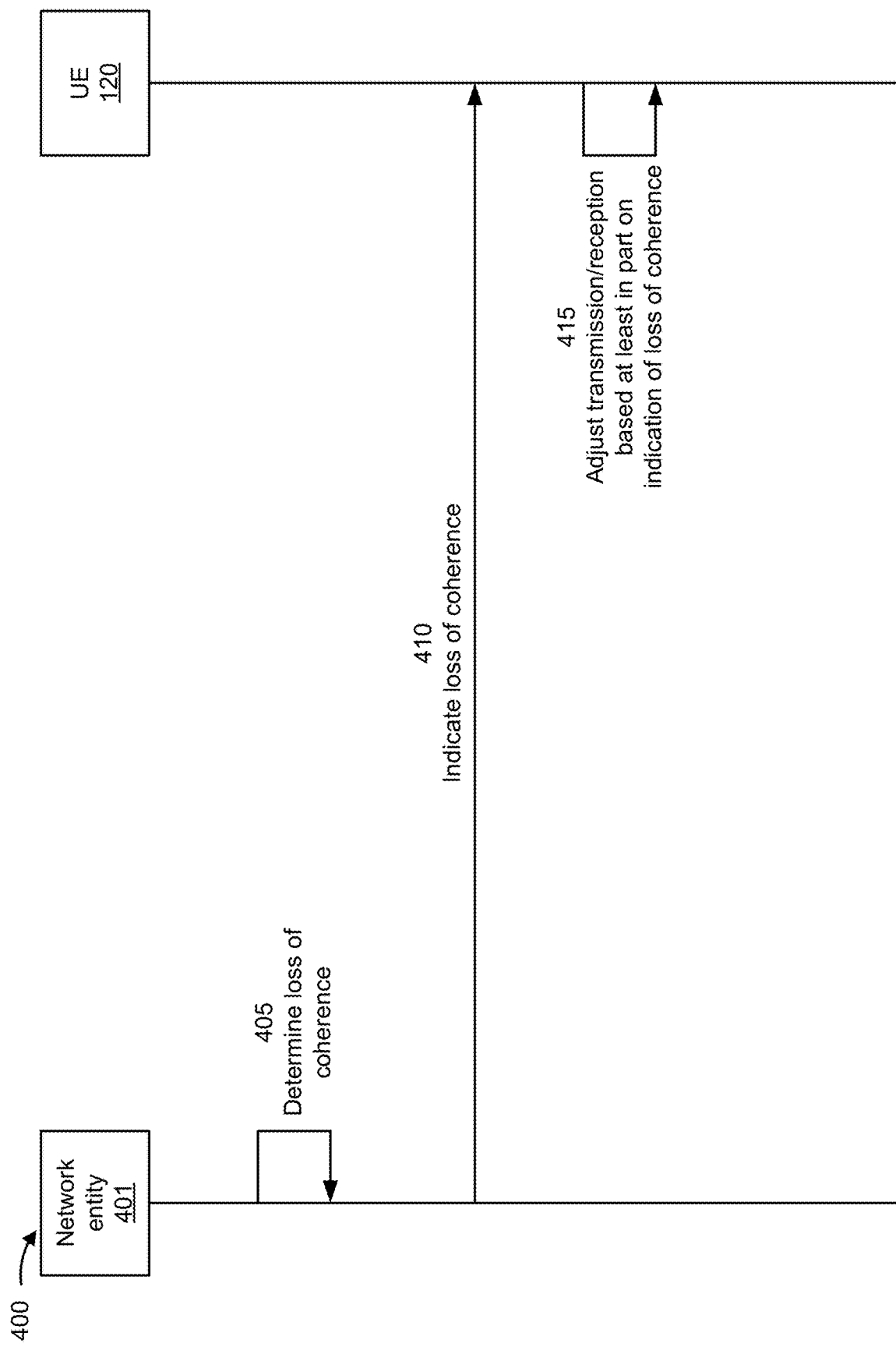
FIG. 4 is a diagram illustrating an example associated with indicating a loss of coherence in a wireless network, in accordance with the present disclosure.

FIG. 4 is a diagram illustrating an example 400 associated with indicating a loss of coherence in a wireless network, in accordance with the present disclosure. As shown in FIG. 4, a network entity 401 and a UE 120 may communicate with one another (e.g., on wireless network 100 of FIG. 1).

As shown in connection with reference number 405, the network entity 401 may determine a loss of coherence associated with the UE 120. For example, the network entity 401 may detect a change in phase and/or a change in transmit power associated with uplink transmissions from the UE 120. Accordingly, the network entity 401 may determine the loss of coherence based at least in part on detecting the change in phase and/or transmit power.

Additionally, or alternatively, in some aspects, the network entity 401 may detect a change to a transmission parameter or a reception parameter that causes the loss of coherence. For example, the change may include adjusting a PA associated with the network entity 401 (e.g., by modifying an operating point of the PA, such as by shifting a local oscillator (LO) associated with the PA, and/or by modifying a gain associated with the PA). The network entity 401 may modify the operating point of the PA in order to decrease noise being received along with signals from the UE 120 or to decrease noise generated by transmissions to the UE 120. The network entity 401 may increase the gain associated with the PA in order to increase a transmit power of transmissions to the UE 120 (which increases the quality and/or reliability of those transmissions) or to increase chances of successfully decoding signals received from the UE 120. On the other hand, the network entity 401 may decrease the gain associated with the PA in order to decrease noise generated by, and power consumed by, transmissions to the UE 120 or to decrease noise that interferes with decoding of signals received from the UE 120. Accordingly, the network entity 401 may determine the loss of coherence based at least in part on detecting the adjustment to the PA.

Additionally, or alternatively, the change may include changing an antenna port used by the network entity 401 (e.g., directly or via an RU associated with the network entity 401) for reception from the UE 120 and/or transmission to the UE 120. For example, the network entity 401 may change from one TRP to a different TRP for transmitting to the UE 120 and/or receiving from the UE 120 in order to improve quality and/or reliability of communications with the UE 120. Additionally, or alternatively, the network entity 401 may switch to a different resource grid for transmitting to the UE 120 and/or receiving from the UE 120 in order to improve quality and/or reliability of communications with the UE 120. Accordingly, the network entity 401 may determine the loss of coherence based at least in part on detecting the change to the antenna port.

Additionally, or alternatively, the change may include changing a MIMO configuration. For example, the network entity 401 may change at least one TRP of a plurality of TRPs (e.g., add a new TRP, remove a TRP, and/or switch one TRP for a different TRP) used for transmitting to the UE 120 and/or receiving from the UE 120 (e.g., directly or via an RU associated with the network entity 401) in order to increase throughput to the UE 120 and/or to improve quality and/or reliability of communications with the UE 120. Additionally, or alternatively, the network entity 401 may switch to a different beam (or set of beams) for transmitting to the UE 120 and/or receiving from the UE 120 (e.g., directly or via an RU associated with the network entity 401) in order to increase throughput to the UE 120 and/or to improve quality and/or reliability of communications with the UE 120. Accordingly, the network entity 401 may determine the loss of coherence based at least in part on detecting the change to the MIMO configuration.

Additionally with, or alternatively to, determining the loss of coherence, the network entity 401 may receive an indication of the loss of coherence (e.g., as described below in connection with FIG. 6) on a feeder link or on a service link from a gateway (e.g., as described below in connection with FIG. 5).

As shown in connection with reference number 410, the network entity 401 may transmit, and the UE 120 may receive, an indication of the loss of coherence. In some aspects, the indication of the loss of coherence may be included in a system information block (SIB), a radio resource control (RRC) message, a medium access control (MAC) layer control element (MAC-CE), and/or downlink control information (DCI). In some aspects, the indication of the loss of coherence may include a new coherence configuration for the UE 120 to replace an old coherence configuration for the UE 120. As used herein, "coherence configuration" may refer to a data structure (e.g., as defined in 3GPP specifications and/or another standard) that indicates repetitions (e.g., of a downlink transmission and/or an uplink transmission) for which the UE 120 should maintain coherence. For example, a coherence configuration may explicitly or implicitly indicate at least a time domain window. For example, the time domain window may be indicated with a time offset (e.g., an amount of clock time and/or a quantity of slots and/or subframes from a beginning of a frame, an amount of time and/or a quantity of symbols from a beginning of a slot, and/or another offset), a duration (e.g., an amount of clock time, a quantity of subframes, a quantity of slots, a quantity of symbols, and/or another duration), and/or a periodicity (e.g., a period as measured in clock time, frames, subframes, slots, and/or symbols), associated with the repetitions. As used herein, "slot" may refer to a portion of a subframe, which in turn may be a fraction of a radio frame within an LTE, 5G, or other wireless communication structure. In some aspects, a slot may include one or more symbols. Additionally, "symbol" may refer to an OFDM symbol or another similar symbol within a slot. Accordingly, the network entity 401 may transmit, to each UE for which coherence is lost (including the UE 120), a corresponding new coherence configuration. In some aspects, the network entity 401 may use on-demand SIBs, UE-specific RRC messages, MAC-CEs, and/or UE-specific DCI to indicate the new coherence configurations.

Additionally, or alternatively, the indication of the loss of coherence may include a cancellation of an old coherence configuration for the UE 120. For example, the network entity 401 may transmit a bit, a sequence, and/or other message that indicates the loss of coherence and triggers each UE for which coherence is lost (including the UE 120) to refrain from applying a corresponding old coherence configuration. As used herein, the message may "trigger" by causing the UE 120 to perform an action (e.g., refraining from applying the old coherence configuration for the UE 120) in response to receiving the message and/or in response to information included in, and/or indicated by, the message. Additionally, or alternatively, the message may "trigger" by providing the UE 120 with one or more parameters and/or other information that the UE 120 uses to perform an action (e.g., refraining from applying the old coherence configuration for the UE 120). Accordingly, the network entity 401 may broadcast the indication to all UEs for which coherence is lost (including the UE 120). In some aspects, the network entity 401 may use SIB1, broadcast RRC messages, MAC-CEs, and/or group-common DCI to indicate cancellation of the old coherence configurations for the UEs. The network entity 401 may transmit one or more new coherence configurations (e.g., as described above) to one or more of the UEs (including the UE 120) once the loss of coherence is over.

Additionally, or alternatively, the indication of the loss of coherence may include a starting time associated with the loss of coherence (e.g., a starting clock time, frame, subframe, slot, and/or symbol) and/or a duration associated with the loss of coherence (e.g., an amount of clock time, a quantity of subframes, a quantity of slots, a quantity of symbols, and/or another duration). For example, the network entity 401 may estimate the duration based at least in part on how much time the change that caused the loss of coherence will consume before being completed. Additionally, or alternatively, the gateway may indicate the duration to the network entity 401 along with an indication of the loss of coherence (e.g., as described below in connection with FIG. 6). Accordingly, the network entity 401 may broadcast the indication to all UEs for which coherence is lost (including the UE 120). In some aspects, the network entity 401 may use SIB1, broadcast RRC messages, MAC-CEs, and/or group-common DCI to indicate the loss of coherence to the UEs. In some aspects, the UEs may resume use of corresponding coherence configurations after the duration is over. Additionally, or alternatively, the network entity 401 may transmit one or more new coherence configurations (e.g., as described above) to one or more of the UEs (including the UE 120) once the loss of coherence is over.

As shown in connection with reference number 415, the UE 120 may perform at least one adjustment to a transmission parameter or a reception parameter based at least in part on the indication of the loss of coherence. In some aspects, the indication of the loss of coherence may be associated with an uplink to the network entity 401. For example, the indication may include at least one bit indicating an association with the uplink. As an alternative, the indication may lack at least one bit indicating an association, and the UE 120 may assume that the indication is associated with the uplink by default.

Accordingly, the at least one adjustment to the transmission parameter may include adjusting a transmit power. For example, the UE 120 may increase the transmit power in order to improve quality and/or reliability of uplink transmissions. The UE 120 may decrease the transmit power in order to decrease noise generated with signals to the network entity 401 and/or to comply with safety regulations (e.g., when the UE 120 is within a threshold distance of a person or other animate being). Additionally, or alternatively, the UE 120 may adjust a transmit frequency. For example, the UE 120 may perform analog frequency retuning in order to compensate for a change in Doppler shift and thus improve quality and/or reliability of uplink transmissions. Additionally, or alternatively, the UE 120 may adapt a transmission time. For example, the UE 120 may transmit uplink transmissions with a larger or smaller time offset from the beginning of a frame, subframe, slot, and/or symbol in order to compensation for a change in propagation delay, and thus improve quality and/or reliability of uplink transmissions. Additionally, or alternatively, the UE 120 may change an antenna port. For example, the UE 120 may use a different antenna panel and/or a different beam to transmit to the network entity 401 in order to improve quality and/or reliability of uplink transmissions.

Additionally, or alternatively, the indication of the loss of coherence may be associated with a downlink from the network entity 401. For example, the indication may include at least one bit indicating an association with the downlink. As an alternative, the indication may lack at least one bit indicating an association, and the UE 120 may assume that the indication is associated with the downlink by default.

Accordingly, the at least one adjustment to the reception parameter may include refraining from joint channel estimation across a plurality of slots. For example, the network entity 401 may refrain from maintaining coherence on the downlink across downlink slots (e.g., PDSCH slots) such that the UE 120 would waste power and processing resources by attempting to perform joint channel estimation across slots because the network entity 401 is not maintaining phase and/or power across the slots. Indeed, the UE 120 would be unable to successfully decode downlink transmissions from the network entity 401 if the UE 120 were to perform joint channel estimation across slots when the network entity 401 is not maintaining coherence. Additionally, or alternatively, the UE 120 may adjust a downscaling parameter and/or a frequency tuning associated with at least one reception antenna of the UE 120. For example, the UE 120 may increase a downscaling parameter in order to decrease noise that interferes with decoding of signals received from the network entity 401 (or from an RU associated with the network entity 401). The UE 120 may decrease a downscaling parameter in order to increase chances of successfully decoding signals received from the network entity 401 (or from an RU associated with the network entity 401). Similarly, the UE 120 may perform analog frequency retuning in order to decrease noise received along with signals from the network entity 401 (or from an RU associated with the network entity 401) and/or to increase chances of successfully decoding the signals received from the network entity 401 (or from an RU associated with the network entity 401). Additionally, or alternatively, the UE 120 may refrain from blind decoding. For example, the UE 120 may attempt to perform decoding by combining signals received in different slots by default before performing decoding individually. However, when the network entity 401 refrains from maintaining coherence on the downlink across downlink slots (e.g., PDSCH slots), the UE 120 wastes power and processing resources by attempting to decode by combining signals across slots because the network entity 401 is not maintaining phase and/or power across the slots. Accordingly, the UE 120 conserves power and processing resources by performing decoding individually in different slots, based at least in part on the indication of the loss of coherence, rather than performing blind decoding.

By using techniques as described in connection with FIG. 4, the UE 120 may perform an adjustment to a transmission component when the network entity 401 loses coherence on the uplink. For example, the UE 120 may adjust a transmit power, adjust a transmit frequency, adjust a transmit time, or change an antenna port associated with uplink transmissions. As a result, the UE 120 improves quality and/or reliability of the uplink transmissions based at least in part on changing channel conditions with the network entity 401 (or with an RU associated with the network entity 401). The UE 120 also conserves network resources by reducing a chance of having to retransmit on the uplink due to low quality and/or reliability. In some aspects, the UE 120 additionally conserves power and/or processing resources by selecting a transmit power, transmit frequency, transmit time, and/or antenna port that requires less power and/or less computational complexity, respectively. In some aspects, the network entity 401 may also schedule a downlink transmission earlier because the UE 120 does not need to maintain coherence across uplink repetitions, which reduces latency. Additionally, or alternatively, the UE 120 may perform an adjustment to a reception component when the network entity 401 loses coherence on the downlink. For example, the UE 120 may refrain from joint channel estimation across a plurality of slots, adjust a downscaling parameter or a frequency tuning associated with at least one reception antenna of the UE 120, or refrain from blind decoding. As a result, the UE 120 conserves power and processing resources.

As indicated above, FIG. 4 is provided as an example. Other examples may differ from what is described with respect to FIG. 4.

Figure 5:
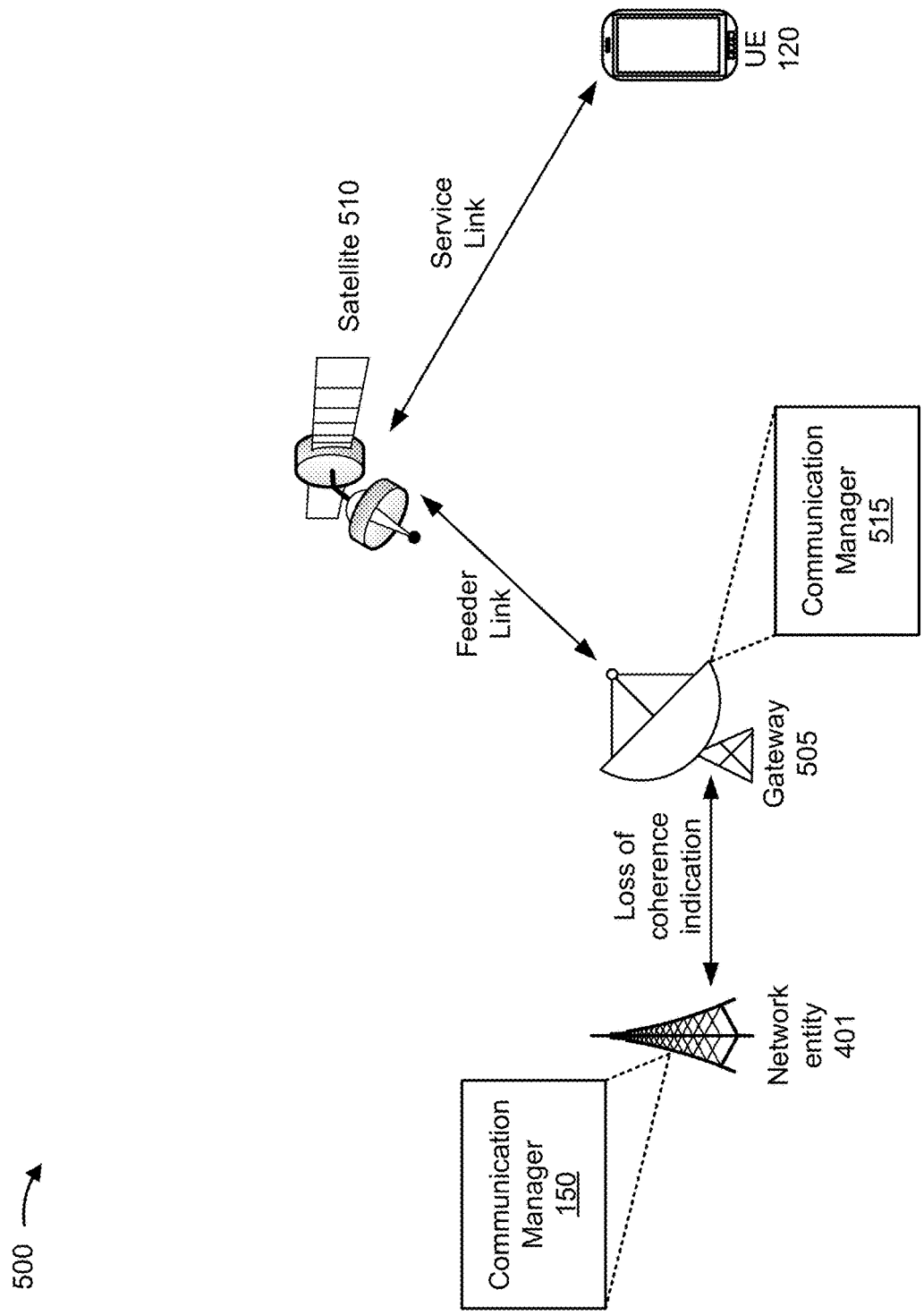
FIG. 5 is a diagram illustrating an example of a non-terrestrial network (NTN), in accordance with the present disclosure.

FIG. 5 is a diagram illustrating an example 500 of an NTN, in accordance with the present disclosure. As shown in FIG. 5, a network entity 401 may be included in an NTN. Accordingly, the network entity 401 may communicate with one or more satellites (e.g., satellite 510) using a gateway 505. The network entity 401 and the gateway 505 may communicate using a wired connection (e.g., a wired backhaul) and/or a wireless connection (e.g., a wireless backhaul). Although described as separate from the network entity 401, the gateway 505 may be at least partially integrated with the network entity 401 (e.g., physically, virtually and/or logically). As shown in FIG. 5, "feeder link" may refer to the wireless channel(s) between the gateway 505 and the satellite 510. In some aspects, the satellite may be replaced by a HAP station, such as a balloon.

Accordingly, the satellite 510 may serve one or more UEs (e.g., UE 120). For example, control information and data from the network entity 401 may be sent to the UE 120 via the satellite 510. Similarly, control information and data from the UE 120 may be sent to the network entity 401 via the satellite 510. As shown in FIG. 5, "service link" may refer to the wireless channel(s) between the satellite 510 and the UE 120.

In some aspects, the satellite 510 may be transparent. As used herein, "transparent satellite" may refer to a satellite that does not decode signals received from the network entity 401 (via the gateway 505). Instead, the transparent satellite may amplify and forward signals from the network entity 401 (via the gateway 505). In some aspects, the transparent satellite may additionally perform frequency translation (e.g., from one or more frequencies that the gateway 505 used to transmit to the satellite 510 into one or more other frequencies which the UE 120 is configured to receive), frequency compensation (e.g., to compensate for movement of the satellite 510 due to orbit, using analog frequency retuning and/or another technique), and/or time compensation (e.g., delaying a relay to the UE 120 to compensate for movement of the satellite 510 due to orbit). Similarly, a transparent satellite may perform one or more similar procedures on a signal from the UE 120.

In some situations, a satellite (and/or other relay device), based at least in part on instructions from a gateway, may change an operating point of a PA in one of its TRPs, change an antenna port (e.g., used for reception or transmission), change TRPs and/or beams to support MIMO for the UE 120 and/or one or more other UEs, adjust frequency compensation, adjust time compensation, and/or change a gain associated with at least one antenna of the satellite. Accordingly, a network entity may lose coherence even when the network entity and/or the gateway did not perform an adjustment that would result in a loss of coherence.

In some aspects, as shown in FIG. 5, the gateway device 505 may include a communication manager 515. As shown in FIG. 5 and described in more detail elsewhere herein, the communication manager 515 may identify a loss of coherence associated with the UE 120 and output for transmission to the network entity 401 an indication of the loss of coherence. As a result, the network entity 401 may take action to improve quality and/or reliability of communications with the UE 120, conserve power and/or processing resources, and/or conserve network resources (e.g., as described above in connection with FIG. 4). Additionally, or alternatively, the communication manager 515 may perform one or more other operations described herein.

In some aspects, as shown in FIG. 5, the network entity 401 may include a communication manager 150. As described in more detail elsewhere herein, the communication manager 150 may obtain from the gateway 505 a first indication of a loss of coherence associated with the UE 120, generating a second indication of the loss of coherence based on the first indication, and output for transmission (e.g., to the UE 120) the second indication. As a result, the network entity 401 can improve quality and/or reliability of communications with the UE 120, conserve power and/or processing resources, and/or conserve network resources (e.g., as described above in connection with FIG. 4). Additionally, or alternatively, the communication manager 150 may perform one or more other operations described herein.

As indicated above, FIG. 5 is provided as an example. Other examples may differ from what is described with respect to FIG. 5.

Figure 6:
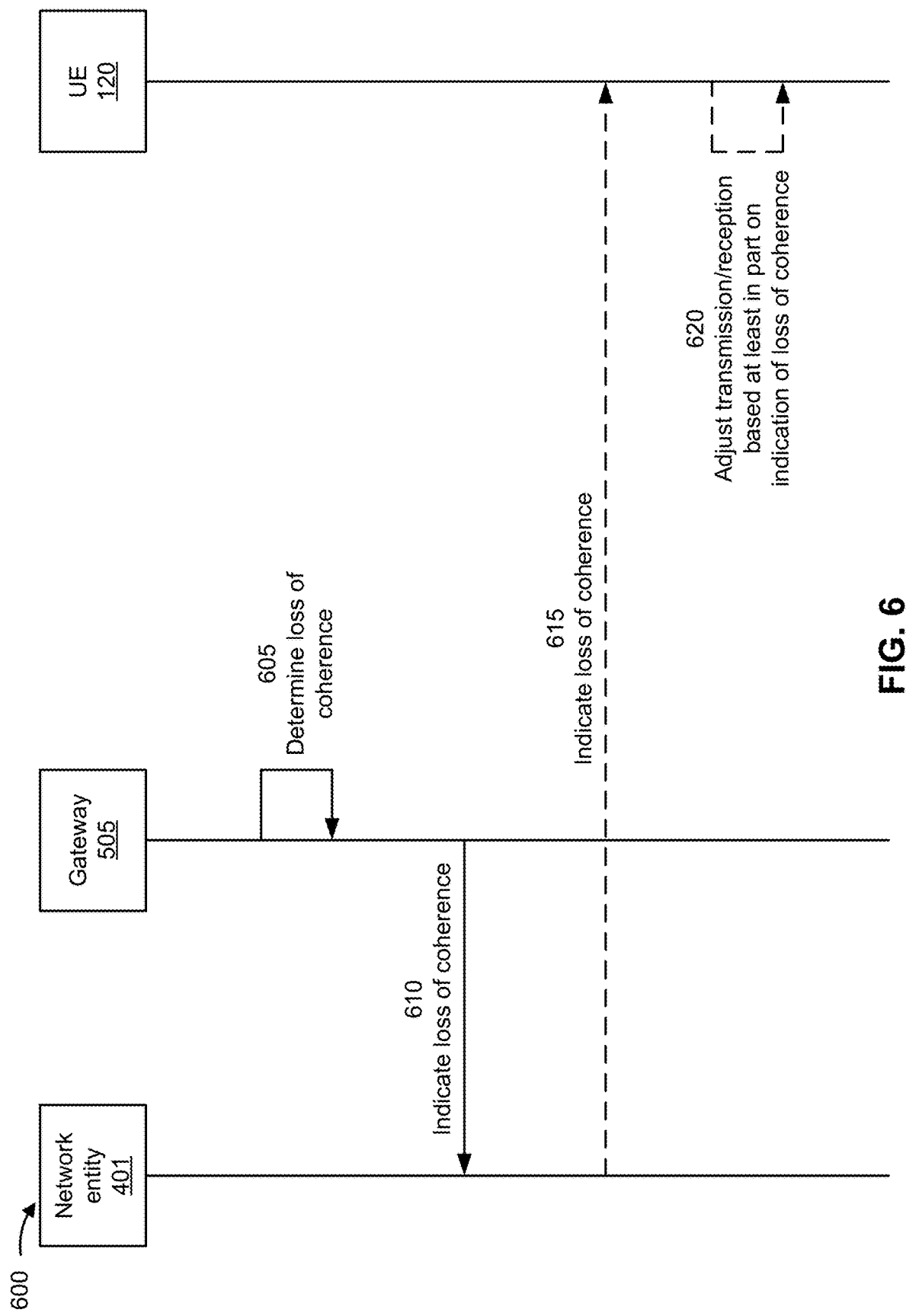
FIG. 6 is a diagram illustrating an example associated with indicating a loss of coherence in an NTN, in accordance with the present disclosure.

FIG. 6 is a diagram illustrating an example 600 associated with indicating a loss of coherence in an NTN, in accordance with the present disclosure. As shown in FIG. 6, a network entity 401 and a UE 120 may communicate with one another via a gateway 505 (e.g., as described above in connection with FIG. 5). Although not shown in FIG. 6, the gateway 505 may communicate with the UE 120 via a satellite (e.g., satellite 510 as described above in connection with FIG. 5).

As shown in connection with reference number 605, the gateway 505 may determine a loss of coherence associated with at least one UE (e.g., the UE 120). For example, the gateway 505 may detect a change in phase and/or a change in transmit power associated with uplink transmissions from the UE 120. Accordingly, the gateway 505 may determine the loss of coherence based at least in part on detecting the change in phase and/or transmit power.

In some aspects, the gateway 505 may detect a change to a transmission parameter or a reception parameter, at a satellite (e.g., satellite 510 as described above in connection with FIG. 5), that causes the loss of coherence. For example, the change may include adjusting a PA of the satellite (e.g., by modifying an operating point of the PA, such as by shifting an LO associated with the PA, and/or by modifying a gain associated with the PA). The satellite may modify the operating point of the PA in order to decrease noise being received along with signals from the UE 120 on a service link or from the gateway 505 on a feeder link, or to decrease noise generated by transmissions to the UE 120 on the service link or to the gateway 505 on the feeder link. The satellite may increase the gain associated with the PA in order to increase a transmit power of transmissions to the UE 120 on the service link or to the gateway 505 on the feeder link (which increases the quality and/or reliability of those transmissions), or to increase chances of successfully decoding signals received from the UE 120 on the service link or from the gateway 505 on the feeder link. On the other hand, the satellite may decrease the gain associated with the PA in order to decrease noise generated by, and power consumed by, transmissions to the UE 120 on the service link or to the gateway 505 on the feeder link, or to decrease noise that interferes with decoding of signals received from the UE 120 on the service link or from the gateway 505 on the feeder link. Accordingly, the gateway 505 may determine the loss of coherence based at least in part on detecting the adjustment to the PA.

Additionally, or alternatively, the change may include changing an antenna port used by the satellite for reception from the UE 120 on the service link or from the gateway 505 on the feeder link and/or used for transmission to the UE 120 on the service link or to the gateway 505 on the feeder link. For example, the satellite may change from one TRP to a different TRP for transmitting to the UE 120 on the service link or to the gateway 505 on the feeder link and/or for receiving from the UE 120 on the service link or from the gateway 505 on the feeder link, in order to improve quality and/or reliability of communications with the UE 120 and/or the gateway 505. Additionally, or alternatively, the satellite may switch to a different resource grid for transmitting to the UE 120 on the service link or to the gateway 505 on the feeder link and/or for receiving from the UE 120 on the service link or from the gateway 505 on the feeder link, in order to improve quality and/or reliability of communications with the UE 120 and/or the gateway 505. Accordingly, the gateway 505 may determine the loss of coherence based at least in part on detecting the change to the antenna port.

Additionally, or alternatively, the change may include changing a MIMO configuration. For example, the satellite may change at least one TRP of a plurality of TRPs (e.g., add a new TRP, remove a TRP, and/or switch one TRP for a different TRP) used for transmitting to the UE 120 on the service link or to the gateway 505 on the feeder link and/or for receiving from the UE 120 on the service link or from the gateway 505 on the feeder link, in order to increase throughput to the UE 120 and/or the gateway 505 and/or to improve quality and/or reliability of communications with the UE 120 and/or the gateway 505. Additionally, or alternatively, the satellite may switch to a different beam (or set of beams) for transmitting to the UE 120 on the service link or to the gateway 505 on the feeder link and/or for receiving from the UE 120 on the service link or from the gateway 505 on the feeder link, in order to increase throughput to the UE 120 and/or the gateway 505 and/or to improve quality and/or reliability of communications with the UE 120 and/or the gateway 505. Accordingly, the gateway 505 may determine the loss of coherence based at least in part on detecting the change to the MIMO configuration.

Additionally, or alternatively, the change may include adjusting a frequency compensation used by the satellite on the service link and/or on the service link. For example, the satellite may increase or decrease a frequency compensation to account for a change in Doppler shift (e.g., caused by movement of the satellite), in order to improve quality and/or reliability of communications with the UE 120 and/or the gateway 505. Accordingly, the gateway 505 may determine the loss of coherence based at least in part on detecting the change to the frequency compensation.

Additionally, or alternatively, the change may include adjusting a time compensation used by the satellite on the service link and/or on the service link. For example, the satellite may increase or decrease an offset applied between receiving a signal (e.g., from the UE 120 on the service link or from the gateway 505 on the feeder link) and forward the signal (e.g., to the gateway 505 on the feeder link or to the UE 120 on the service link, respectively) to account for a change in propagation delay (e.g., caused by movement of the satellite), in order to improve quality and/or reliability of communications with the UE 120 and/or the gateway 505. Accordingly, the gateway 505 may determine the loss of coherence based at least in part on detecting the change to the time compensation.

Additionally, or alternatively, the change may include adjusting a gain associated with at least one antenna of the satellite. For example, the satellite may increase the gain in order to increase a transmit power of transmissions to the UE 120 on the service link or to the gateway 505 on the feeder link (which increases the quality and/or reliability of those transmissions). On the other hand, the satellite may decrease the gain in order to decrease noise generated by, and power consumed by, transmissions to the UE 120 on the service link or to the gateway 505 on the feeder link. Accordingly, the gateway 505 may determine the loss of coherence based at least in part on detecting the change to the gain.

As shown in connection with reference number 610, the gateway 505 may transmit, and the network entity 401 may receive, an indication of the loss of coherence. For example, the indication may be included in an Xn message, an F1 application protocol (F1-AP) message, and/or another type of message.

In some aspects, the indication may include a starting time associated with the loss of coherence (e.g., a starting clock time, frame, subframe, slot, and/or symbol) and/or a duration associated with the loss of coherence (e.g., an amount of clock time, a quantity of subframes, a quantity of slots, a quantity of symbols, and/or another duration). For example, the gateway 505 may estimate the duration based at least in part on how much time the change that caused the loss of coherence will consume before being completed.

As an alternative, the indication may include at least one bit that indicates a start of the loss of coherence. For example, the gateway 505 may transmit one bit (e.g., set to '1' or 'TRUE') to indicate the start of the loss of coherence. Accordingly, the gateway 505 may further transmit, and the network entity 401 may further receive, at least one bit that indicates an end of the loss of coherence. For example, the gateway 505 may transmit one bit (e.g., set to '0' or 'FALSE) to indicate the end of the loss of coherence.

In any of the aspects described above, the indication may include an indicator of a service link to the network entity 401 or a feeder link to the UE 120 (e.g., as described above in connection with FIG. 5). For example, the indication may include at least one bit indicating an association with the service link. As an alternative, the indication may lack at least one bit indicating an association, and the network entity 401 may assume that the indication is associated with the service link by default. In another example, the indication may include at least one bit indicating an association with the feeder link. As an alternative, the indication may lack at least one bit indicating an association, and the network entity 401 may assume that the indication is associated with the feeder link by default.

Additionally, or alternatively, the indication may include an indicator of a downlink direction to the UE 120 or an uplink direction to the network entity 401. For example, the indication may include at least one bit indicating an association with the uplink. As an alternative, the indication may lack at least one bit indicating an association, and the network entity 401 may assume that the indication is associated with the uplink by default. In another example, the indication may include at least one bit indicating an association with the downlink. As an alternative, the indication may lack at least one bit indicating an association, and the network entity 401 may assume that the indication is associated with the downlink by default.

By using techniques as described in connection with FIG. 6, the gateway 505 may indicate a loss of coherence to the network entity 401. As a result, the network entity 401 may take action to improve quality and/or reliability of communications with the UE 120, conserve power and/or processing resources, and/or conserve network resources (e.g., as described above in connection with FIG. 4). For example, as shown in connection with reference number 615, the network entity 401 may transmit, and the UE 120 may receive, an indication based at least in part on the loss of coherence. The network entity 401 may transmit the indication as described above in connection with FIG. 4. Although not shown in FIG. 6, the network entity 401 may transmit the indication via the gateway 505 and the satellite.

Accordingly, as shown in connection with reference number 620, the UE 120 may perform at least one adjustment to a transmission parameter or a reception parameter based at least in part on the indication from the network entity 401.

The UE 120 may perform the at least one adjustment as described above in connection with FIG. 4.

As indicated above, FIG. 6 is provided as an example. Other examples may differ from what is described with respect to FIG. 6.

Figure 7:
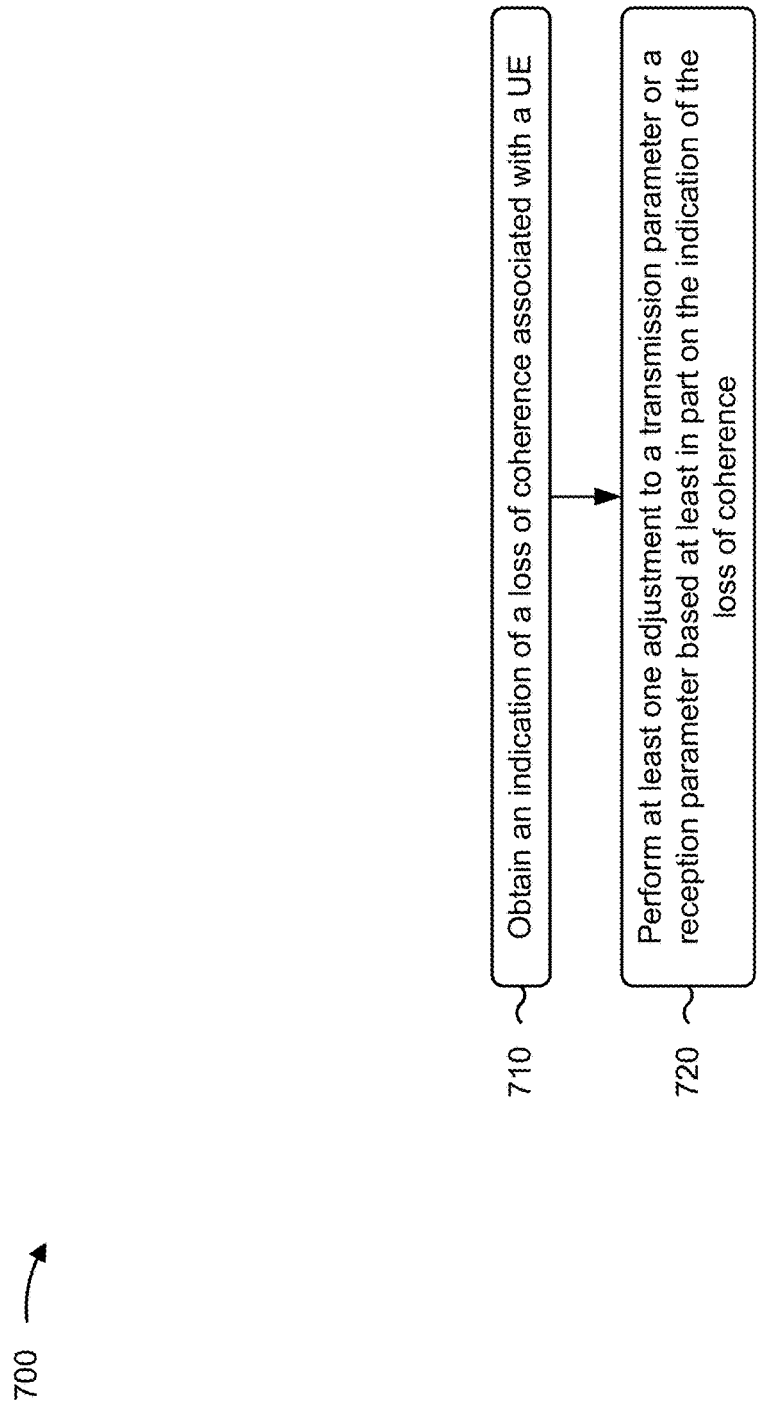
FIGS. 7, 8, 9, and 10 are diagrams illustrating example processes associated with indicating a loss of coherence in a wireless network, in accordance with the present disclosure.

FIG. 7 is a diagram illustrating an example process 700 performed, for example, by a UE, in accordance with the present disclosure. Example process 700 is an example where the UE (e.g., UE 120 and/or apparatus 1100 of FIG. 11) performs operations associated with indicating a loss of coherence in a wireless network.

Figure 11:
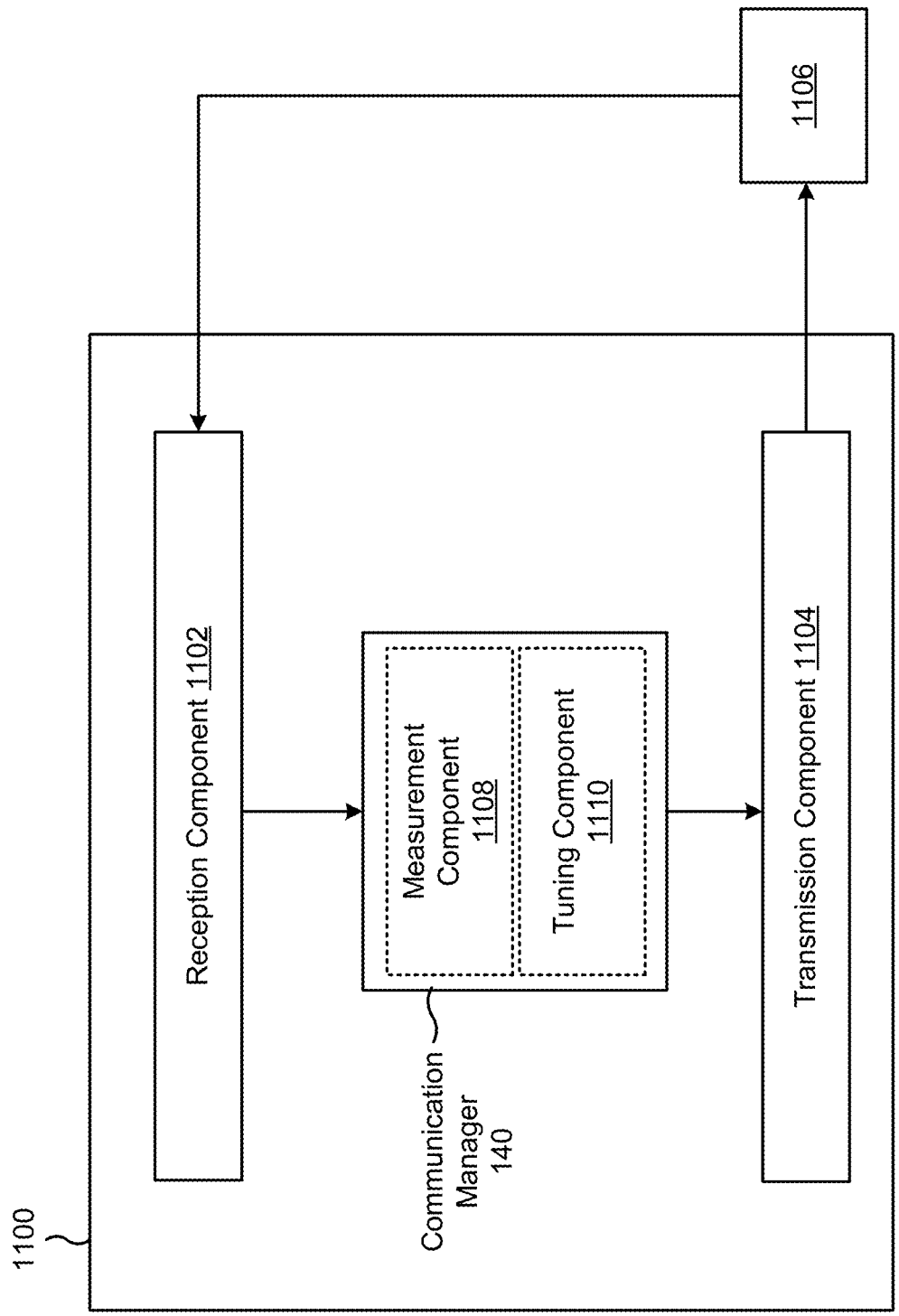
FIGS. 11, 12, and 13 are diagrams of example apparatuses for wireless communication, in accordance with the present disclosure.
Figure 12:
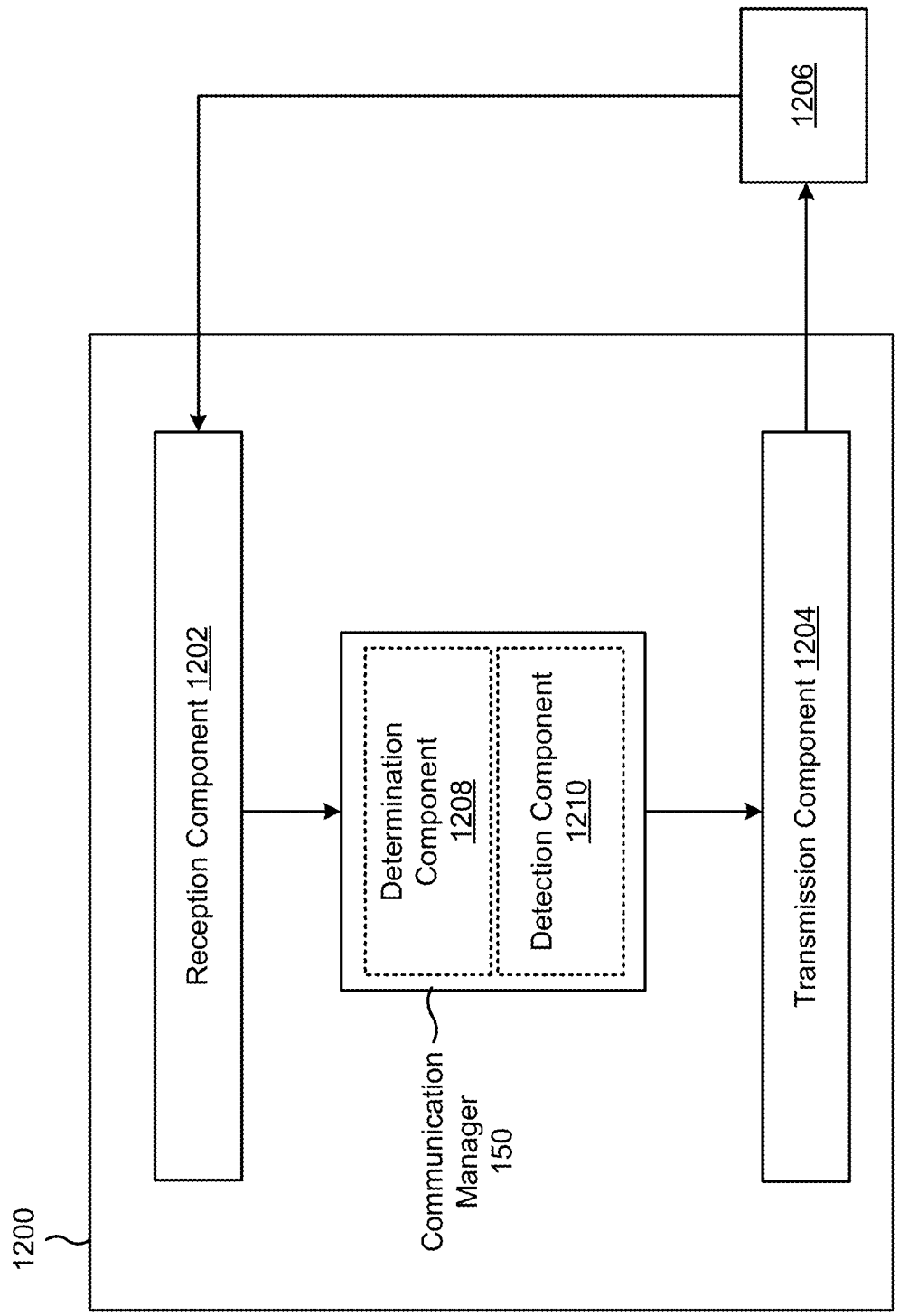

As shown in FIG. 7, in some aspects, process 700 may include obtaining (e.g., from a network entity, such as network entity 401 and/or apparatus 1200 of FIG. 12) an indication of a loss of coherence associated with the UE (block 710). For example, the UE (e.g., using communication manager 140 and/or reception component 1102, depicted in FIG. 11) may obtain an indication of a loss of coherence associated with the UE, as described herein.

As further shown in FIG. 7, in some aspects, process 700 may include performing at least one adjustment to a transmission parameter or a reception parameter based at least in part on the indication of the loss of coherence (block 720). For example, the UE (e.g., using communication manager 140, measurement component 1108, and/or tuning component 1110, depicted in FIG. 11) may perform at least one adjustment to a transmission parameter or a reception parameter based at least in part on the indication of the loss of coherence, as described herein.

Process 700 may include additional aspects, such as any single aspect or any combination of aspects described below and/or in connection with one or more other processes described elsewhere herein.

In a first aspect, the indication of the loss of coherence includes a new coherence configuration for the UE to replace an old coherence configuration for the UE.

In a second aspect, alone or in combination with the first aspect, the indication of the loss of coherence is obtained via an SIB, an RRC message, a MAC-CE, or DCI.

In a third aspect, alone or in combination with one or more of the first and second aspects, the new coherence configuration indicates a time offset, a duration, a periodicity, or a combination thereof.

In a fourth aspect, alone or in combination with one or more of the first through third aspects, the indication of the loss of coherence includes a starting time associated with the loss of coherence, a duration associated with the loss of coherence, or a combination thereof.

In a fifth aspect, alone or in combination with one or more of the first through fourth aspects, the indication of the loss of coherence is obtained via an SIB, an RRC message, a MAC-CE, or group common DCI.

In a sixth aspect, alone or in combination with one or more of the first through fifth aspects, the indication of the loss of coherence includes a cancellation of an old coherence configuration for the UE.

In a seventh aspect, alone or in combination with one or more of the first through sixth aspects, the old coherence configuration indicates a time offset, a duration, a periodicity, or a combination thereof.

In an eighth aspect, alone or in combination with one or more of the first through seventh aspects, the indication of the loss of coherence is associated with an uplink from the UE to a network entity.

In a ninth aspect, alone or in combination with one or more of the first through eighth aspects, the at least one adjustment to the transmission parameter includes adjusting a transmit power, adjusting a transmit frequency, adapting a transmission time, changing an antenna port, or a combination thereof.

In a tenth aspect, alone or in combination with one or more of the first through ninth aspects, the indication of the loss of coherence is associated with a downlink from a network entity to the UE.

In an eleventh aspect, alone or in combination with one or more of the first through tenth aspects, the at least one adjustment to the reception parameter includes refraining from joint channel estimation across a plurality of slots, adjusting a downscaling parameter or a frequency tuning associated with at least one reception antenna, refraining from blind decoding, or a combination thereof.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
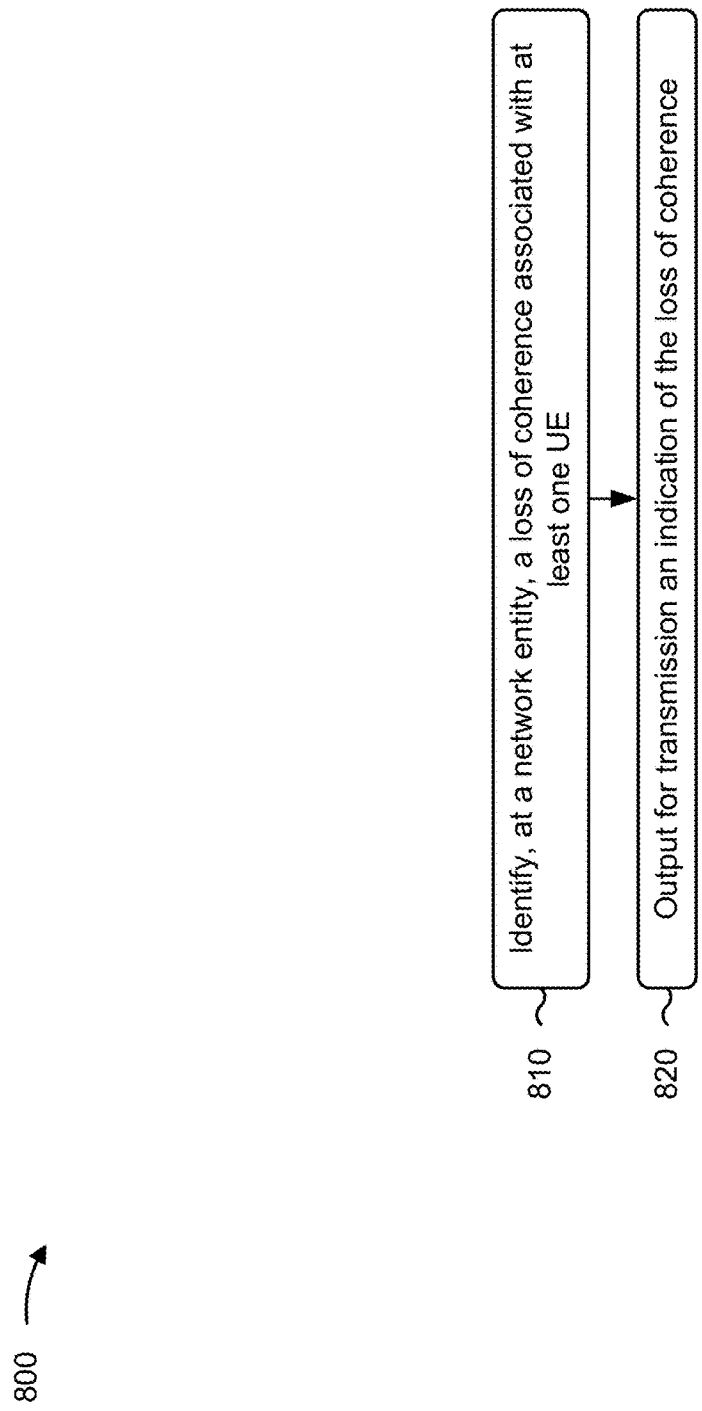

FIG. 8 is a diagram illustrating an example process 800 performed, for example, by a network entity, in accordance with the present disclosure. Example process 800 is an example where the network entity (e.g., network entity 401 and/or apparatus 1200 of FIG. 12) performs operations associated with indicating a loss of coherence in a wireless network.

As shown in FIG. 8, in some aspects, process 800 may include identifying a loss of coherence associated with at least one UE (e.g., UE 120 and/or apparatus 1100 of FIG. 11) (block 810). For example, the network entity (e.g., using communication manager 150 and/or determination component 1208, depicted in FIG. 12) may identify a loss of coherence associated with at least one UE, as described herein.

As further shown in FIG. 8, in some aspects, process 800 may include outputting for transmission an indication of the loss of coherence (block 820). For example, the network entity (e.g., using communication manager 150 and/or transmission component 1204, depicted in FIG. 12) may output for transmission an indication of the loss of coherence, as described herein.

Process 800 may include additional aspects, such as any single aspect or any combination of aspects described below and/or in connection with one or more other processes described elsewhere herein.

In a first aspect, the indication of the loss of coherence includes at least one new coherence configuration for the at least one UE to replace at least one old coherence configuration for the at least one UE.

In a second aspect, alone or in combination with the first aspect, the indication of the loss of coherence is output for transmission via an SIB, an RRC message, a MAC-CE, or DCI.

In a third aspect, alone or in combination with one or more of the first and second aspects, the new coherence configuration indicates a time offset, a duration, a periodicity, or a combination thereof.

In a fourth aspect, alone or in combination with one or more of the first through third aspects, the indication of the loss of coherence includes a starting time associated with the loss of coherence, a duration associated with the loss of coherence, or a combination thereof.

In a fifth aspect, alone or in combination with one or more of the first through fourth aspects, the indication of the loss of coherence is output for transmission via an SIB, an RRC message, a MAC-CE, or group common DCI.

In a sixth aspect, alone or in combination with one or more of the first through fifth aspects, the indication of the loss of coherence includes cancellation of at least one old coherence configuration for the at least one UE.

In a seventh aspect, alone or in combination with one or more of the first through sixth aspects, the old coherence configuration indicates a time offset, a duration, a periodicity, or a combination thereof.

In an eighth aspect, alone or in combination with one or more of the first through seventh aspects, the indication of the loss of coherence is associated with an uplink from the at least one UE to the network entity.

In a ninth aspect, alone or in combination with one or more of the first through eighth aspects, the indication of the loss of coherence is associated with a downlink from the network entity to the at least one UE.

In a tenth aspect, alone or in combination with one or more of the first through ninth aspects, the identification of the loss of coherence includes obtaining (e.g., using communication manager 150 and/or reception component 1202, depicted in FIG. 12), from a gateway in communication with the at least one UE, an indication of a loss of coherence on a feeder link or on a service link.

In an eleventh aspect, alone or in combination with one or more of the first through tenth aspects, the identification of the loss of coherence includes detecting (e.g., using communication manager 150 and/or detection component 1210, depicted in FIG. 12) a change to a transmission parameter or a reception parameter that causes the loss of coherence.

In a twelfth aspect, alone or in combination with one or more of the first through eleventh aspects, the change includes adjusting a PA associated with the network entity, changing an antenna port, changing a MIMO configuration, or a combination thereof.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
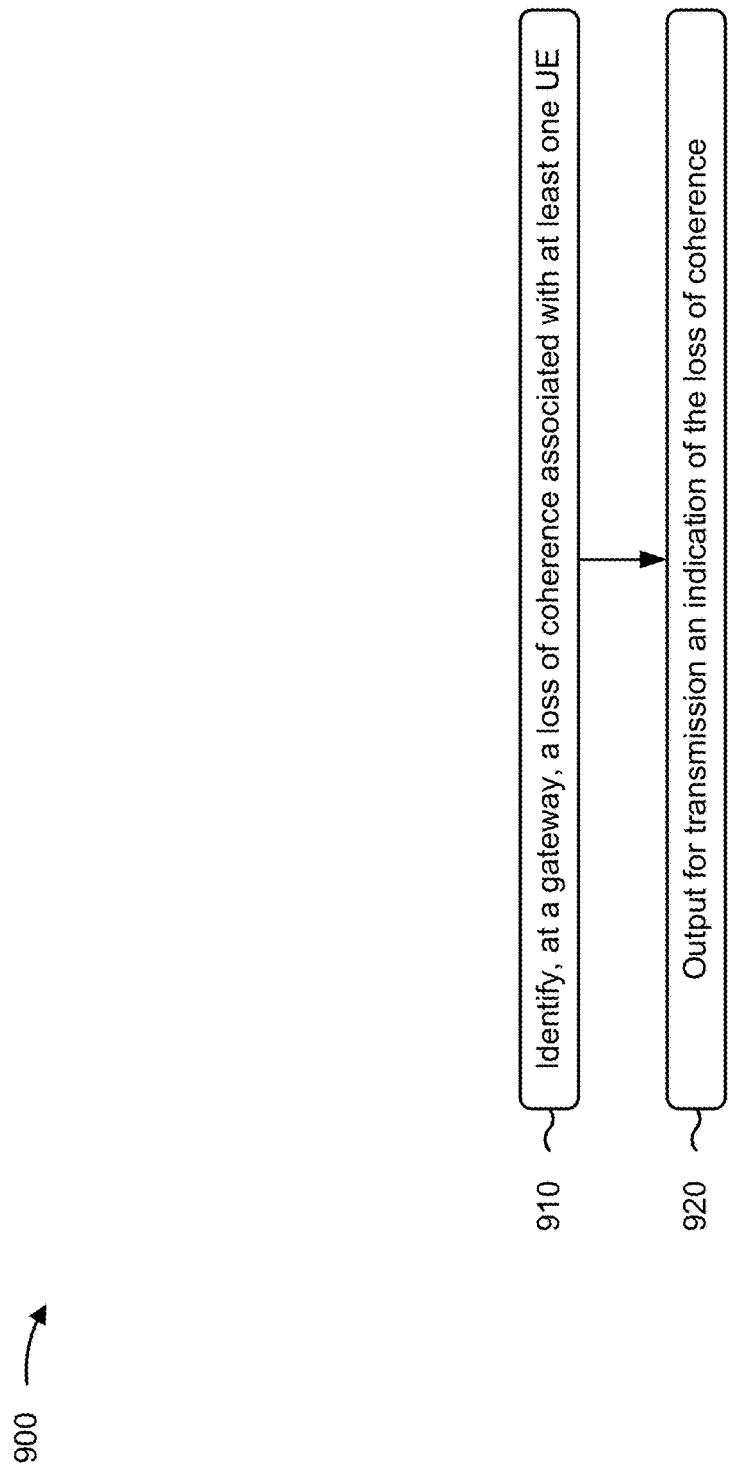

FIG. 9 is a diagram illustrating an example process 900 performed, for example, by a gateway device, in accordance with the present disclosure. Example process 900 is an example where the gateway device (e.g., gateway device 505 and/or apparatus 1300 of FIG. 13) performs operations associated with indicating a loss of coherence in a wireless network.

As shown in FIG. 9, in some aspects, process 900 may include identifying a loss of coherence associated with at least one UE (e.g., UE 120 and/or apparatus 1100 of FIG. 11) (block 910). For example, the gateway device (e.g., using communication manager 515 and/or determination component 1308, depicted in FIG. 13) may identify a loss of coherence associated with at least one UE, as described herein.

As further shown in FIG. 9, in some aspects, process 900 may include outputting for transmission, to a network entity (e.g., network entity 401 and/or apparatus 1200 of FIG. 12), an indication of the loss of coherence (block 920). For example, the gateway device (e.g., using communication manager 515 and/or transmission component 1304, depicted in FIG. 13) may output for transmission an indication of the loss of coherence, as described herein.

Process 900 may include additional aspects, such as any single aspect or any combination of aspects described below and/or in connection with one or more other processes described elsewhere herein.

Figure 13:
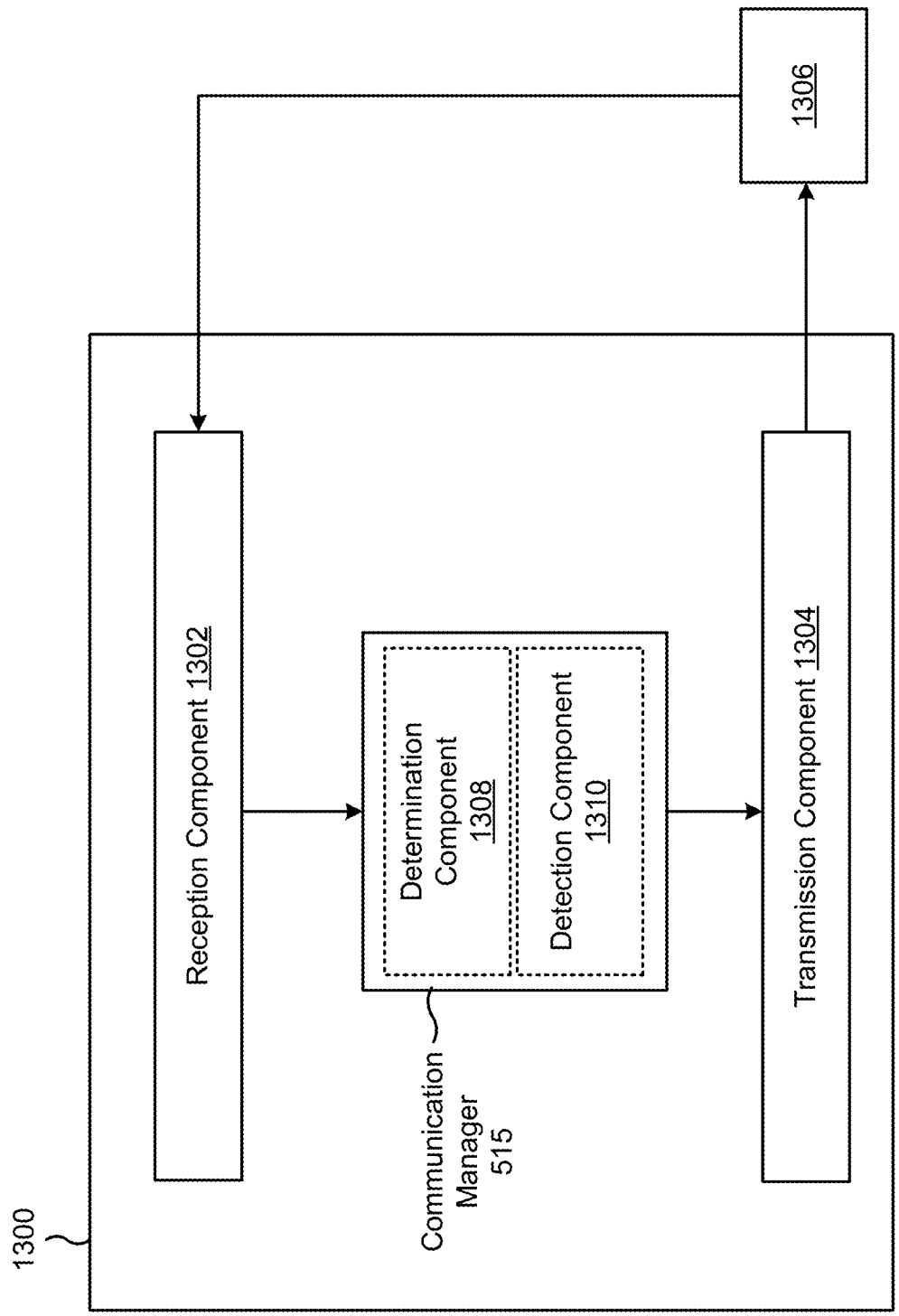

In a first aspect, the identification of the loss of coherence includes detecting (e.g., using communication manager 515 and/or transmission component 1304, depicted in FIG. 13), a change to a transmission parameter or a reception parameter, at a satellite, that causes the loss of coherence.

In a second aspect, alone or in combination with the first aspect, the change includes adjusting a PA of the satellite, changing an antenna port, changing a MIMO configuration, adjusting frequency compensation, adjusting time compensation, changing a gain associated with at least one antenna of the satellite, or a combination thereof.

In a third aspect, alone or in combination with one or more of the first and second aspects, the indication includes a starting time associated with the loss of coherence, a duration associated with the loss of coherence, or a combination thereof.

In a fourth aspect, alone or in combination with one or more of the first through third aspects, the indication includes at least one bit that indicates a start of the loss of coherence.

In a fifth aspect, alone or in combination with one or more of the first through fourth aspects, process 900 further includes outputting for transmission (e.g., using communication manager 515 and/or transmission component 1304), to the network entity, at least one bit that indicates an end of the loss of coherence.

In a sixth aspect, alone or in combination with one or more of the first through fifth aspects, the indication includes an indicator of a service link between the at least one UE and a satellite or a feeder link between the gateway device and the satellite.

In a seventh aspect, alone or in combination with one or more of the first through sixth aspects, the indication includes an indicator of a direction from the network entity to the at least one UE or a direction from the at least one UE to the network entity.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
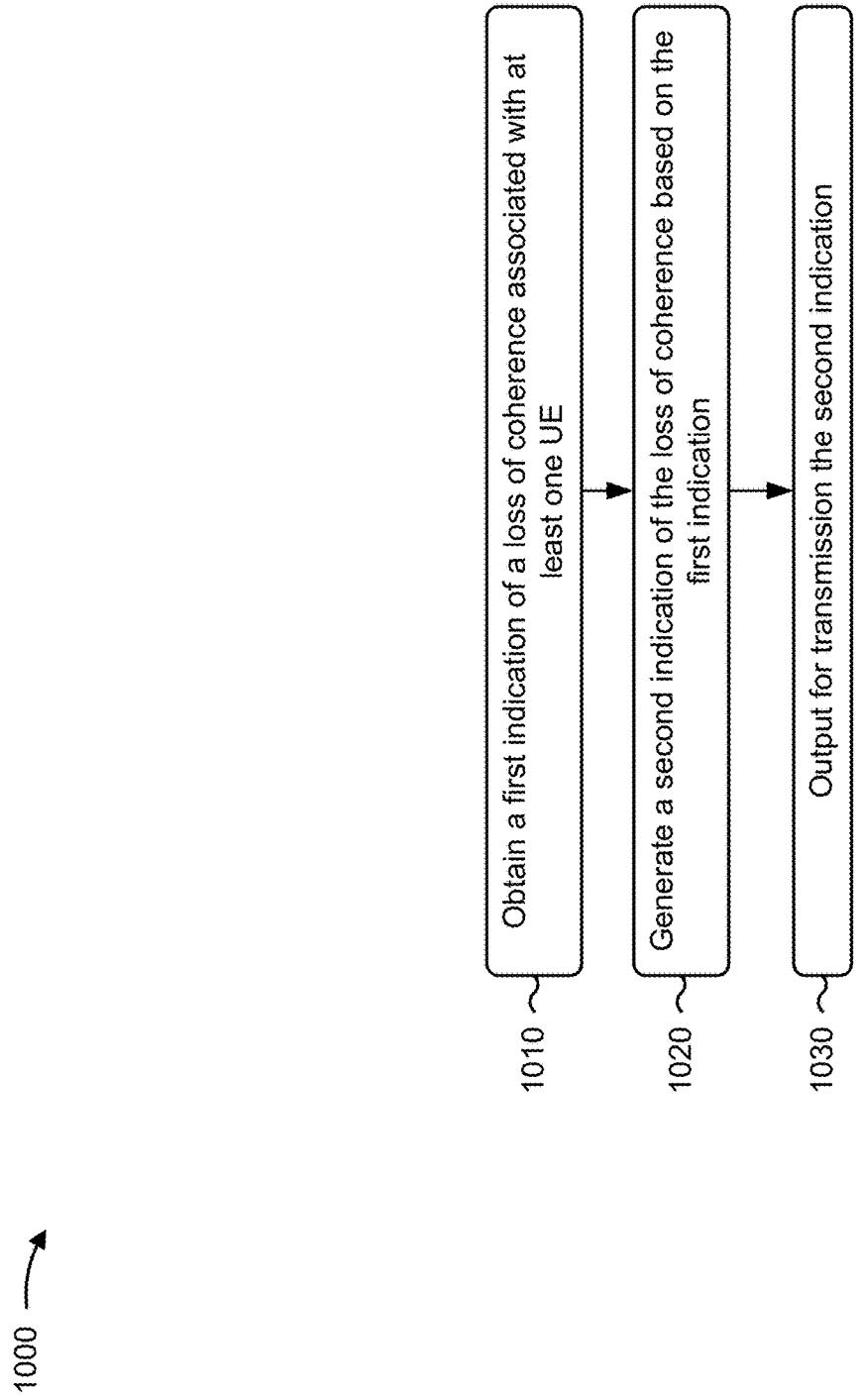

FIG. 10 is a diagram illustrating an example process 1000 performed, for example, by a network entity, in accordance with the present disclosure. Example process 1000 is an example where the network entity (e.g., network entity 401 and/or apparatus 1200 of FIG. 12) performs operations associated with indicating a loss of coherence in a wireless network.

As shown in FIG. 10, in some aspects, process 1000 may include obtaining, from a gateway (e.g., gateway 505 and/or apparatus 1300 of FIG. 13), a first indication of a loss of coherence associated with at least one UE (e.g., UE 120 and/or apparatus 1100 of FIG. 11) (block 1010). For example, the network entity (e.g., using communication manager 150 and/or reception component 1202, depicted in FIG. 12) may obtain a first indication of a loss of coherence associated with at least one UE, as described herein.

As further shown in FIG. 10, in some aspects, process 1000 may include generating a second indication of the loss of coherence based on the first indication (block 1020). For example, the network entity (e.g., using communication manager 150 and/or determination component 1208, depicted in FIG. 12) may generate a second indication of the loss of coherence based on the first indication, as described herein.

As further shown in FIG. 10, in some aspects, process 1000 may include outputting for transmission the second indication (block 1030). For example, the network entity (e.g., using communication manager 150 and/or transmission component 1204, depicted in FIG. 12) may output for transmission the second indication, as described herein.

Process 1000 may include additional aspects, such as any single aspect or any combination of aspects described below and/or in connection with one or more other processes described elsewhere herein.

In a first aspect, the first indication includes a starting time associated with the loss of coherence, a duration associated with the loss of coherence, or a combination thereof.

In a second aspect, alone or in combination with the first aspect, the first indication includes at least one bit that indicates a start of the loss of coherence.

In a third aspect, alone or in combination with one or more of the first and second aspects, process 1000 further includes obtaining (e.g., using communication manager 150 and/or reception component 1202, depicted in FIG. 12), from the gateway, at least one bit that indicates an end of the loss of coherence.

In a fourth aspect, alone or in combination with one or more of the first through third aspects, the first indication includes an indicator of a service link between the at least one UE and a satellite or a feeder link between the gateway and the satellite.

In a fifth aspect, alone or in combination with one or more of the first through fourth aspects, the first indication includes an indicator of a direction from the network entity to the at least one UE or a direction from the at least one UE to the network entity.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a network entity, or another wireless communication device) using the reception component 1102 and the transmission component 1104. As further shown, the apparatus 1100 may include the communication manager 140. The communication manager 140 may include one or more of a measurement component 1108 or a tuning component 1110, among other examples.

In some aspects, the apparatus 1100 may be configured to perform one or more operations described herein in connection with FIGS. 4 and 6. Additionally, or alternatively, the apparatus 1100 may be configured to perform one or more processes described herein, such as process 700 of FIG. 7, or a combination thereof. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

In some aspects, the reception component 1102 may obtain an indication of a loss of coherence associated with the apparatus 1100. Accordingly, the measurement component 1108 and/or the tuning component 1110 may perform at least one adjustment to a transmission parameter or a reception parameter based at least in part on the reception component 1102 receiving the indication of the loss of coherence. For example, the measurement component 1108 may measure a new beam associated with a stronger signal and switch to the new beam (e.g., at the transmission component 1104 and/or at the reception component 1102) based at least in part on the indication of the loss of coherence. Additionally, or alternatively, the tuning component 1110 may perform analog frequency retuning (e.g., at the transmission component 1104 and/or at the reception component 1102) to compensate for changing Doppler shift.

In some examples, means for transmitting, outputting, or sending (or means for outputting for transmission) may include one or more antennas, a modulator, a transmit MIMO processor, a transmit processor, or a combination thereof, of the UE described above in connection with FIG. 2.

In some examples, means for receiving (or means for obtaining) may include one or more antennas, a demodulator, a MIMO detector, a receive processor, or a combination thereof, of the UE described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for determining, means for obtaining, means for sending, means for performing at least one adjustment to a transmission parameter or a reception parameter, means for measuring, or means for tuning may include various processing system components, such as a receive processor, a transmit processor, a controller/processor, a memory, or a combination thereof, of the UE described above in connection with FIG. 2.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

FIG. 12 is a block diagram of an example apparatus 1200 for wireless communication. The apparatus 1200 may be a network entity, or a network entity may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a network entity, or another wireless communication device) using the reception component 1202 and the transmission component 1204. As further shown, the apparatus 1200 may include the communication manager 150. The communication manager 150 may include one or more of a determination component 1208 or a detection component 1210, among other examples.

In some aspects, the apparatus 1200 may be configured to perform one or more operations described herein in connection with FIGS. 4 and 6. Additionally, or alternatively, the apparatus 1200 may be configured to perform one or more processes described herein, such as process 800 of FIG. 8, process 1000 of FIG. 10, or a combination thereof. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be co-located with the reception component 1202 in a transceiver.

In some aspects, the determination component 1208 may identify a loss of coherence associated with at least one UE (e.g., which may include the apparatus 1206 and/or be in communication with the apparatus 1206). For example, the detection component 1210 may detect a change to a transmission parameter (e.g., at the transmission component 1204) or a reception parameter (e.g., at the reception component 1202) that causes the loss of coherence. Accordingly, the determination component 1208 may identify the loss of coherence based at least in part on output from the detection component 1210. Accordingly, the transmission component 1204 may output for transmission an indication of the loss of coherence.

In some aspects, the reception component 1202 may obtain, from a gateway in communication with the at least one UE, an indication of the loss of coherence on a feeder link or on a service link. Accordingly, the determination component 1208 may identify the loss of coherence based at least in part on the indication received by the reception component 1202. In some aspects, the reception component 1202 may further obtain, from the gateway, at least one bit that indicates an end of the loss of coherence.

In some examples, means for transmitting, outputting, or sending (or means for outputting for transmission) may include one or more antennas, a modulator, a transmit MIMO processor, a transmit processor, or a combination thereof, of the base station described above in connection with FIG. 2.

In some examples, means for receiving (or means for obtaining) may include one or more antennas, a demodulator, a MIMO detector, a receive processor, or a combination thereof, of the bases station described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for determining, means for obtaining, means for sending, means for detecting, or means for identifying may include various processing system components, such as a receive processor, a transmit processor, a controller/processor, a memory, or a combination thereof, of the base station described above in connection with FIG. 2.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

FIG. 13 is a block diagram of an example apparatus 1300 for wireless communication. The apparatus 1300 may be a gateway, or a gateway may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a network entity, or another wireless communication device) using the reception component 1302 and the transmission component 1304. As further shown, the apparatus 1300 may include the communication manager 515. The communication manager 515 may include one or more of a determination component 1308 or a detection component 1310, among other examples.

In some aspects, the apparatus 1300 may be configured to perform one or more operations described herein in connection with FIG. 6. Additionally, or alternatively, the apparatus 1300 may be configured to perform one or more processes described herein, such as process 900 of FIG. 9, or a combination thereof. In some aspects, the apparatus 1300 and/or one or more components shown in FIG. 13 may include one or more components of the base station described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the base station described above in connection with FIG. 2. In some aspects, the transmission component 1304 may be co-located with the reception component 1302 in a transceiver.

In some aspects, the determination component 1308 may identify a loss of coherence associated with at least one UE. For example, the detection component 1310 may detect a change to a transmission parameter or a reception parameter, at a satellite, that causes the loss of coherence. Accordingly, the determination component 1308 may identify the loss of coherence based at least in part on output from the detection component 1310. Accordingly, the transmission component 1304 may output for transmission, to a network entity (e.g., which may include the apparatus 1206 and/or be in communication with the apparatus 1206), an indication of the loss of coherence. In some aspects, the transmission component 1304 may further output for transmission, to the network entity, at least one bit that indicates an end of the loss of coherence.

In some examples, means for transmitting, outputting, or sending (or means for outputting for transmission) may include one or more antennas, a modulator, a transmit MIMO processor, a transmit processor, or a combination thereof, of the base station described above in connection with FIG. 2.

In some examples, means for receiving (or means for obtaining) may include one or more antennas, a demodulator, a MIMO detector, a receive processor, or a combination thereof, of the base station described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for determining, means for obtaining, means for sending, means for identifying, or means for detecting may include various processing system components, such as a receive processor, a transmit processor, a controller/processor, a memory, or a combination thereof, of the base station described above in connection with FIG. 2.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed at a user equipment (UE), comprising: obtaining an indication of a loss of coherence associated with the UE; and performing at least one adjustment to a transmission parameter or a reception parameter based at least in part on the indication of the loss of coherence.

Aspect 2: The method of Aspect 1, wherein the indication of the loss of coherence comprises a new coherence configuration for the UE to replace an old coherence configuration for the UE.

Aspect 3: The method of Aspect 2, wherein the new coherence configuration indicates a time offset, a duration, a periodicity, or a combination thereof.

Aspect 4: The method of any of Aspects 1 through 3, wherein the indication of the loss of coherence comprises a cancellation of an old coherence configuration for the UE.

Aspect 5: The method of any of Aspects 2 through 4, wherein the old coherence configuration indicates a time offset, a duration, a periodicity, or a combination thereof.

Aspect 6: The method of any of Aspects 1 through 5, wherein the indication of the loss of coherence includes a starting time associated with the loss of coherence, a duration associated with the loss of coherence, or a combination thereof.

Aspect 7: The method of any of Aspects 1 through 6, wherein the indication of the loss of coherence is obtained via a system information block, a radio resource control message, a medium access control layer control element, downlink control information, or group common downlink control information.

Aspect 8: The method of any of Aspects 1 through 7, wherein the indication of the loss of coherence is associated with an uplink from the UE to a network entity.

Aspect 9: The method of any of Aspects 1 through 8, wherein the at least one adjustment to the transmission parameter comprises: adjusting a transmit power; adjusting a transmit frequency; adapting a transmission time; changing an antenna port; or a combination thereof.

Aspect 10: The method of any of Aspects 1 through 9, wherein the indication of the loss of coherence is associated with a downlink from a network entity to the UE.

Aspect 11: The method of any of Aspects 1 through 10, wherein the at least one adjustment to the reception parameter comprises: refraining from joint channel estimation across a plurality of slots; adjusting a downscaling parameter or a frequency tuning associated with at least one reception antenna; refraining from blind decoding; or a combination thereof.

Aspect 12: A method of wireless communication at a network entity or a gateway device, comprising: identifying a loss of coherence associated with at least one user equipment (UE); and outputting for transmission an indication of the loss of coherence.

Aspect 13: The method of Aspect 12, wherein the indication of the loss of coherence comprises at least one new coherence configuration for the at least one UE to replace at least one old coherence configuration for the at least one UE.

Aspect 14: The method of Aspect 13, wherein the new coherence configuration indicates a time offset, a duration, a periodicity, or a combination thereof.

Aspect 15: The method of any of Aspects 12 through 14, wherein the indication of the loss of coherence comprises cancellation of at least one old coherence configuration for the at least one UE.

Aspect 16: The method of any of Aspects 13 through 15, wherein the old coherence configuration indicates a time offset, a duration, a periodicity, or a combination thereof.

Aspect 17: The method of any of Aspects 12 through 16, wherein the indication of the loss of coherence includes a starting time associated with the loss of coherence, a duration associated with the loss of coherence, or a combination thereof.

Aspect 18: The method of any of Aspects 12 through 17, wherein the indication of the loss of coherence is output for transmission via a system information block, a radio resource control message, a medium access control layer control element, downlink control information, or group common downlink control information.

Aspect 19: The method of any of Aspects 12 through 18, wherein the indication of the loss of coherence is associated with an uplink from the at least one UE to the network entity.

Aspect 20: The method of any of Aspects 12 through 19, wherein the indication of the loss of coherence is associated with a downlink from the network entity to the at least one UE.

Aspect 21: The method of any of Aspects 12 through 20, wherein the identification of the loss of coherence comprises: obtaining, from a gateway in communication with the at least one UE, an indication of a loss of coherence on a feeder link or on a service link.

Aspect 22: The method of any of Aspects 12 through 20, wherein the identification of the loss of coherence comprises: detecting a change to a transmission parameter or a reception parameter that causes the loss of coherence.

Aspect 23: The method of Aspect 22, wherein the change comprises: adjusting a power amplifier associated with the network entity; changing an antenna port; changing a multiple-input multiple-output configuration; or a combination thereof.

Aspect 24: The method of any of Aspects 12 through 20, wherein the identification of the loss of coherence comprises: detecting a change to a transmission parameter or a reception parameter, at a satellite, that causes the loss of coherence.

Aspect 25: The method of Aspect 24, wherein the change comprises: adjusting a power amplifier of the satellite; changing an antenna port; changing a multiple-input multiple-output configuration; adjusting frequency compensation; adjusting time compensation; changing a gain associated with at least one antenna of the satellite; or a combination thereof.

Aspect 26: The method of any of Aspects 12 through 25, wherein the indication includes a starting time associated with the loss of coherence, a duration associated with the loss of coherence, or a combination thereof.

Aspect 27: The method of any of Aspects 12 through 26, wherein the indication includes at least one bit that indicates a start of the loss of coherence.

Aspect 28: The method of Aspect 27, further comprising: outputting for transmission at least one bit that indicates an end of the loss of coherence.

Aspect 29: The method of any of Aspects 12 through 28, wherein the indication includes an indicator of a service link between the at least one UE and a satellite or a feeder link between the gateway device and the satellite.

Aspect 30: The method of any of Aspects 12 through 29, wherein the indication includes an indicator of a direction from the network entity to the at least one UE or a direction from the at least one UE to the network entity.

Aspect 31: A method of wireless communication performed at a network entity, comprising: obtaining, from a gateway, a first indication of a loss of coherence associated with at least one user equipment (UE); generating a second indication of the loss of coherence based on the first indication; and outputting for transmission the second indication.

Aspect 32: The method of Aspect 31, wherein the first indication includes a starting time associated with the loss of coherence, a duration associated with the loss of coherence, or a combination thereof.

Aspect 33: The method of Aspect 31, wherein the first indication includes at least one bit that indicates a start of the loss of coherence.

Aspect 34: The method of Aspect 33, further comprising: obtaining, from the gateway, at least one bit that indicates an end of the loss of coherence.

Aspect 35: The method of any of Aspects 31 through 34, wherein the first indication includes an indicator of a service link between the at least one UE and a satellite or a feeder link between the gateway and the satellite.

Aspect 36: The method of any of Aspects 31 through 35, wherein the first indication includes an indicator of a direction from the network entity to the at least one UE or a direction from the at least one UE to the network entity.

Aspect 37: An apparatus for wireless communication, comprising a memory comprising instructions and one or more processors configured to execute the instructions and cause the apparatus to perform the method of one or more of Aspects 1-11.

Aspect 38: A user equipment (UE), comprising at least one receiver, a memory comprising instructions, and one or more processors configured to execute the instructions and cause the UE to perform the method of one or more of Aspects 1-11, wherein the at least one receiver is configured to receive the indication of the loss of coherence associated with the UE.

Aspect 39: An apparatus for wireless communication, comprising at least one means for performing the method of one or more of Aspects 1-11.

Aspect 40: A non-transitory computer-readable medium comprising one or more instructions that, when executed by one or more processors of an apparatus, cause the apparatus to perform the method of one or more of Aspects 1-11.

Aspect 41: An apparatus for wireless communication, comprising a memory comprising instructions and one or more processors configured to execute the instructions and cause the apparatus to perform the method of one or more of Aspects 12-30.

Aspect 42: A network entity, comprising at least one transmitter, a memory comprising instructions, and one or more processors configured to execute the instructions and cause the network entity to perform the method of one or more of Aspects 12-30, wherein the at least one transmitter is configured to transmit the indication of the loss of coherence.

Aspect 43: A gateway device, comprising at least one transmitter, a memory comprising instructions, and one or more processors configured to execute the instructions and cause the gateway device to perform the method of one or more of Aspects 12-30, wherein the at least one transmitter is configured to transmit the indication of the loss of coherence.

Aspect 44: An apparatus for wireless communication, comprising at least one means for performing the method of one or more of Aspects 12-30.

Aspect 45: A non-transitory computer-readable medium comprising one or more instructions that, when executed by one or more processors of an apparatus, cause the apparatus to perform the method of one or more of Aspects 12-30.

Aspect 46: An apparatus for wireless communication, comprising a memory comprising instructions and one or more processors configured to execute the instructions and to cause the apparatus to perform the method of one or more of Aspects 31-36.

Aspect 47: A network entity, comprising at least one transceiver, a memory comprising instructions, and one or more processors configured to execute the instructions and cause the network entity to perform the method of one or more of Aspects 31-36, wherein the at least one transceiver is configured to receive the first indication and transmit the second indication.

Aspect 48: An apparatus for wireless communication, comprising at least one means for performing the method of one or more of Aspects 31-36.

Aspect 49: A non-transitory computer-readable medium comprising one or more instructions that, when executed by one or more processors of an apparatus, cause the apparatus to perform the method of one or more of Aspects 31-36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising:
memory comprising instructions; and
one or more processors configured to execute the instructions to cause the apparatus to:
obtain an indication of a loss of coherence associated with the apparatus, wherein the indication corresponds to a data structure that indicates a set of repetitions for which the apparatus is to maintain coherence, wherein the indication of the loss of coherence is obtained via a system information block (SIB), medium access control layer control element (MAC-CE), or downlink control information (DCI); and
perform at least one adjustment to a transmission parameter or a reception parameter based at least in part on the indication of the loss of coherence.

2. The apparatus of claim 1, wherein the indication of the loss of coherence comprises a new coherence configuration to replace an old coherence configuration.

3. The apparatus of claim 2, wherein the new coherence configuration indicates at least one of: a time offset, a duration, or a periodicity.

4. The apparatus of claim 1, wherein the indication of the loss of coherence includes at least one of: a starting time associated with the loss of coherence, or a duration associated with the loss of coherence.

5. The apparatus of claim 1, wherein the indication of the loss of coherence is obtained via the DCI, and wherein the DCI comprises a group-common DCI.

6. The apparatus of claim 1, wherein the indication of the loss of coherence comprises a cancellation of an old coherence configuration, and
wherein the one or more processors are further configured to execute the instructions to cause the apparatus to:
obtain, once the loss of coherence is over, at least one new coherence configuration comprising the data structure.

7. The apparatus of claim 6, wherein the old coherence configuration indicates at least one of: a time offset, a duration, or a periodicity.

8. The apparatus of claim 1, wherein the indication of the loss of coherence is associated with an uplink from the apparatus to a network entity.

9. The apparatus of claim 1, wherein the at least one adjustment to the transmission parameter comprises at least one of:
adjusting a transmit power;
adjusting a transmit frequency;
adapting a transmission time; or
changing an antenna port.

10. The apparatus of claim 1, wherein the indication of the loss of coherence is associated with a downlink from a network entity to the apparatus.

11. The apparatus of claim 1, wherein the at least one adjustment to the reception parameter comprises at least one of:
refraining from joint channel estimation across a plurality of slots;
adjusting a downscaling parameter or a frequency tuning associated with at least one reception antenna; or
refraining from blind decoding.

12. The apparatus of claim 1, further comprising:
a receiver configured to receive the indication of the loss of coherence, wherein the apparatus is configured as a UE.

13. An apparatus for wireless communication, comprising:
  memory comprising instructions; and
  one or more processors configured to execute the instructions to cause the apparatus to:
    identify a loss of coherence associated with at least one user equipment (UE); and
    output for transmission an indication of the loss of coherence, wherein the indication corresponds to a data structure that indicates a set of repetitions for which the at least one UE is to maintain coherence, and wherein the indication of the loss of coherence is output for transmission via downlink control information (DCI), a medium access control layer control element (MAC-CE), or a system information block (SIB).

14. The apparatus of claim 13, wherein the indication of the loss of coherence comprises at least one new coherence configuration to replace at least one old coherence configuration.

15. The apparatus of claim 14, wherein the new coherence configuration indicates at least one of: a time offset, a duration, or a periodicity.

16. The apparatus of claim 13, wherein the indication of the loss of coherence includes at least one of: a starting time associated with the loss of coherence, or a duration associated with the loss of coherence.

17. The apparatus of claim 13, wherein the indication of the loss of coherence comprises cancellation of at least one old coherence configuration.

18. The apparatus of claim 17, wherein the old coherence configuration indicates at least one of: a time offset, a duration, or a periodicity.

19. The apparatus of claim 13, wherein the indication of the loss of coherence is associated with an uplink from the at least one UE to the apparatus.

20. The apparatus of claim 13, wherein the indication of the loss of coherence is associated with a downlink from the apparatus to the at least one UE.

21. The apparatus of claim 13, wherein the identification of the loss of coherence comprises:
  obtaining, from a gateway in communication with the at least one UE, an indication of a loss of coherence on a feeder link or on a service link.

22. The apparatus of claim 13, wherein the identification of the loss of coherence comprises:
  detecting, at a network entity, a change to a transmission parameter or a reception parameter that causes the loss of coherence.

23. The apparatus of claim 22, wherein the change comprises at least one of:
  adjusting a power amplifier associated with the network entity;
  changing an antenna port; or
  changing a multiple-input multiple-output configuration.

24. The apparatus of claim 13, wherein the identification of the loss of coherence comprises:
  detecting a change to a transmission parameter or a reception parameter, at a satellite, that causes the loss of coherence.

25. The apparatus of claim 24, wherein the change comprises at least one of:
  adjusting a power amplifier of the satellite;
  changing an antenna port;
  changing a multiple-input multiple-output configuration;
  adjusting frequency compensation;
  adjusting time compensation; or
  changing a gain associated with at least one antenna of the satellite.

26. The apparatus of claim 13, further comprising:
  a transmitter configured to transmit the indication of the loss of coherence, wherein the apparatus is configured as a network entity.

27. The apparatus of claim 13, further comprising:
  a transmitter configured to transmit the indication of the loss of coherence, wherein the apparatus is configured as a gateway device.

28. An apparatus for wireless communication, comprising:
  memory comprising instructions; and
  one or more processors configured to execute the instructions to cause the apparatus to:
    obtain, from a gateway, a first indication of a loss of coherence associated with at least one user equipment (UE);
    generate a second indication of the loss of coherence based on the first indication, wherein the second indication corresponds to a data structure that indicates a set of repetitions for which the at least one UE is to maintain coherence; and
    output for transmission the second indication, wherein the second indication is output for transmission via downlink control information (DCI), a medium access control layer control element (MAC-CE), or a system information block (SIB).

29. The apparatus of claim 28, wherein the first indication includes an indicator of a service link between the at least one UE and a satellite or a feeder link between the gateway and the satellite.

30. The apparatus of claim 28, wherein the first indication includes an indicator of a direction from the apparatus to the at least one UE or a direction from the at least one UE to the apparatus.

31. The apparatus of claim 28, further comprising:
  a transceiver configured to receive the first indication and transmit the second indication, wherein the apparatus is configured as a network entity.

* * * * *